(12) United States Patent
Yamada et al.

(10) Patent No.: US 8,585,148 B2
(45) Date of Patent: Nov. 19, 2013

(54) VEHICLE SEAT LIFTER DEVICE

(75) Inventors: Yukifumi Yamada, Toyota (JP); Tateki Kawamura, Inazawa (JP); Naoaki Hoshihara, Obu (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/640,619

(22) PCT Filed: Mar. 23, 2011

(86) PCT No.: PCT/JP2011/056893
§ 371 (c)(1),
(2), (4) Date: Oct. 11, 2012

(87) PCT Pub. No.: WO2011/135950
PCT Pub. Date: Nov. 3, 2011

(65) Prior Publication Data
US 2013/0026806 A1   Jan. 31, 2013

(30) Foreign Application Priority Data

Apr. 28, 2010   (JP) ................... 2010-103217

(51) Int. Cl.
*A47C 1/00*   (2006.01)
(52) U.S. Cl.
USPC ................... 297/344.15; 297/344.14
(58) Field of Classification Search
USPC ............... 297/344.1, 344.14, 344.15
See application file for complete search history.

(56) References Cited

U.S. PATENT DOCUMENTS

| 5,366,196 | A  | * | 11/1994 | Mitschelen et al. | ........... 248/424 |
| 5,863,098 | A  | * | 1/1999  | Kojima et al. | ........... 297/344.15 |
| 6,488,337 | B1 | * | 12/2002 | De Voss et al. | ........... 297/344.13 |
| 7,717,509 | B2 | * | 5/2010  | Kojima | ........... 297/216.2 |
| 8,029,062 | B2 | * | 10/2011 | Appelqvist et al. | ........... 297/325 |
| 2008/0007104 | A1 |  | 1/2008  | Yokota | |

FOREIGN PATENT DOCUMENTS

| JP | 2002 168276 | 6/2002 |
| JP | 2003 93187  | 4/2003 |
| JP | 2003 125880 | 5/2003 |
| JP | 2010 51502  | 3/2010 |

OTHER PUBLICATIONS

Extended Search Report issued May 16, 2013 in European Patent Application No. 11774734.5.
International Search Report Issued May 17, 2011 in PCT/JP11/056893 Filed Mar. 23, 2011.

* cited by examiner

*Primary Examiner* — Sarah B McPartlin
(74) *Attorney, Agent, or Firm* — Oblon, Spivak, McClelland, Maier & Neustadt, L.L.P.

(57) ABSTRACT

The seat lifter device for a vehicle includes a lock/unlock device which is formed with an engagement/disengagement mechanism to produce a lock condition in which the relative rotation between a first rotation member and a second rotation member is restricted and an unlock condition in which the relative rotation therebetween is allowed by the engagement/disengagement operation of the engagement/disengagement mechanism such that a detent member movably supported on the first rotation member fixed to the base frame side engages with or disengages from the second rotation member fixed to the rear link member. This seat lifter device can firmly hold the seat lifted position even when an exterior force generated upon a vehicle collision is applied to the engagement/disengagement mechanism through the rear link member.

8 Claims, 21 Drawing Sheets

A-A

Fig.7
(A)
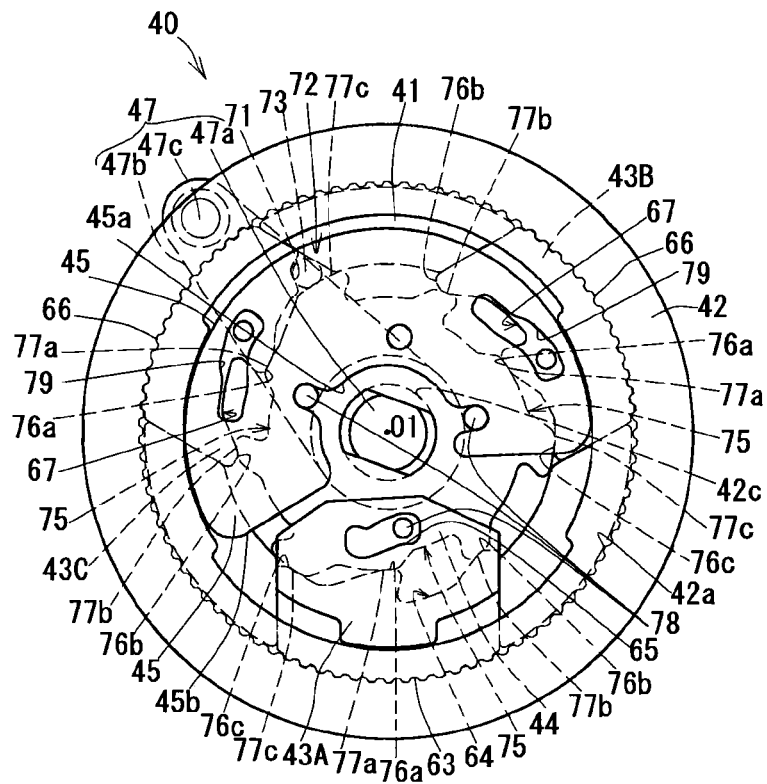
(B)
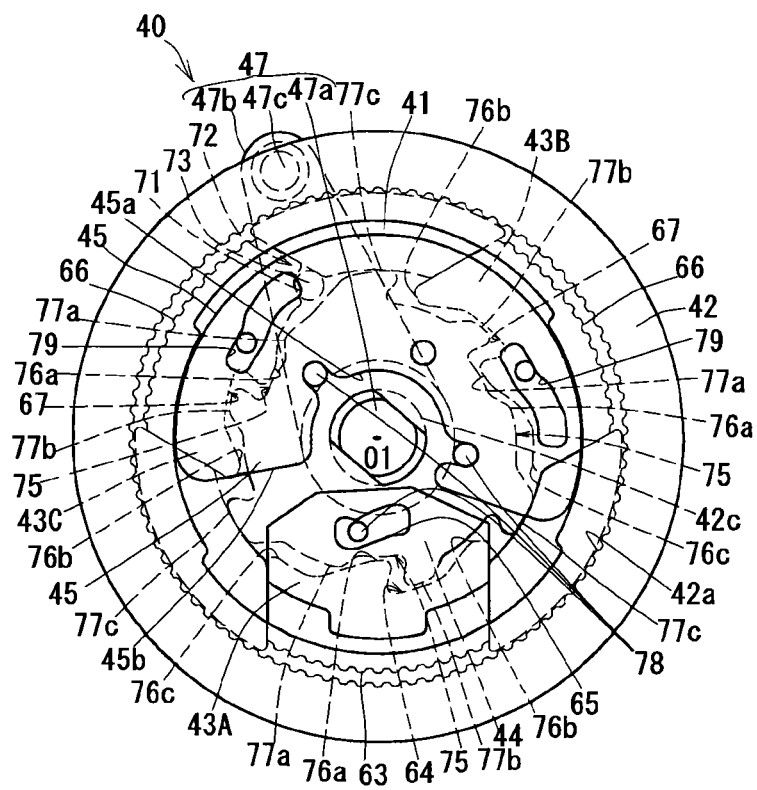

VEHICLE SEAT LIFTER DEVICE

TECHNICAL FIELD

This invention relates to a seat lifter device for a vehicle seat used for adjusting the height of a seat cushion of a vehicle seat.

BACKGROUND OF THE TECHNOLOGY

Generally, a vehicle seat device is provided with a seat lifter device for adjusting the height of the seat cushion and the seat lifter device is operated by operating an operating lever under a condition that an occupant of the seat is seated on the seat cushion to adjust the height of the seat cushion. One of such vehicle seat lifter devices is disclosed in a Patent Document 1.

The vehicle seat lifter device described in the Patent Document 1 uses a roller clutch mechanism for changing over the motion of the operating lever and frictionally keeping the lifted position of the seat by rollers and the seat lifter device uses a parallel link mechanism having two link members which are rotatably connected by a sector gear and a pinion gear. The pinion gear is rotatably driven by the roller clutch mechanism. An occupant of the seat reciprocates the operating lever from the neutral position to upper or lower position under the occupant being kept seated on the seat. Thus the vehicle seat can be successively raised or successively lowered.

THE DOCUMENT OF CONVENTIONAL TECHNOLOGY

Patent Document

Patent Document 1: JP 2003-93187 A

DISCLOSURE OF THE INVENTION

Problems to be Solved by the Invention

The seat lifter device for a vehicle has to have a structure which can keep the lifted position even upon a vehicular collision accident. However, the device according to the Patent Document 1 uses the roller clutch mechanism for frictionally keeping the lifted position. External force is applied to the vehicle seat upon a vehicular collision or the like and such external force is also applied to the roller clutch mechanism through the link members. The link members may not withstand the force and the lifted position of the seat may not be kept.

The present invention was made considering the above issues and it is an object of the present invention to provide a vehicle seat lifter device which can keep the lifted position of the vehicle seat even upon an external force being applied.

Means for Solving the Problem

One aspect of the invention is that a seat lifter device for a vehicle comprises a pair of right and left base frames, a pair of right and left rear link members, a torque rod for connecting the pair of right and left rear link members for torque transmission, a pair of front right and left link members each one end being pivoted on each front portion of the pair of right and rear base frames and forming a parallel link mechanism with the rear link members, a rotation device for relatively rotating the base frames and the rear link members, a lock/unlock device having an engagement/disengagement mechanism for engaging or disengaging a detent member movably supported on a first rotation member fixed to the base frame side with or from a second rotation member fixed to the rear link member side and a rotating member supported on the base frame side and engaging with or disengaging from the engagement/disengagement mechanism, wherein the lock/unlock device produces a lock condition in which the relative rotation between the first and the second rotation members is restricted by the engagement of the detent member with the second rotation member and an unlock condition in which the relative rotation between the first and the second rotation members is allowed by the disengagement of the detent member from the second rotation member and an operating member rotatably supported on the base frame and kept to a neutral position.

Another aspect of the invention is that the seat lifter device includes a lock/unlock device operating mechanism for operating the rotating member of the lock/unlock device to be rotated in response to the rotation of the operating member from the neutral position in one direction thereby to operate the lock/unlock device to be in the unlock condition while the operating member is rotated from the neutral position to a first position and to keep the unlock condition while the operating member is rotated from the first position to a second position, the lock/unlock device operating mechanism further operating the lock/unlock device to return to the lock condition when the position of the operating member exceeds the second position and at the same time operating the operating member to be returnable to the neutral position, the lock/unlock device operating mechanism further operating the rotating member to be rotated in response to the rotation of the operating member from the neutral position in the other direction thereby to operate the lock/unlock device to be in the unlock condition while the operating member is rotated from the neutral position to a third position and at the same time to be returnable to the lock condition when the position of the operating member returns to the neutral position from the third position.

Still another aspect of the invention is that the seat lifter device includes a rotation device driving mechanism which is operated in response to the rotation of the operating member in the one direction from the neutral position, which is idly movable while the operating member is rotated from the neutral position to the first position, which drives the rotation device to rotate the rear link member relative to the base frame in a direction that the seat cushion is raised upwardly while the operating member is rotated from the first position to the second position, which is idly movable while the operating member returns to the neutral position and is operated in response to the rotation of the operating member from the neutral position in the other direction, and which drives the rotation device to be in freely rotatable condition to have the rear link member to be freely rotatable relative to the base frame while the operating member is rotated from the neutral position to the third position.

Further, an aspect of the invention is that the seat lifter device includes the rotation device which includes a sector gear formed integrally with the rear link member and a pinion gear engaged with the sector gear and rotatably supported on the base frame, the rotation device driving mechanism includes a ratchet wheel formed integrally and coaxially with the pinion gear, a feed pawl rotatably supported on the operating member and engaging with the ratchet wheel when the operating member is rotated in the one direction to drive the pinion gear to rotate and disengaging from the ratchet wheel when the operating member is rotated in the other direction and a separating member fixed to the base frame and brought into contact with the feed pawl to have the feed pawl to be separated from the ratchet wheel while the operating member is rotated from the neutral position to the third position.

Still further, an aspect of the invention is that the seat lifter device includes a base frame upward biasing means, one end of which is engaged with the base frame and the other end of which is engaged with the pinion gear of the rotation device and biasing the base frame to move upwardly.

Further, an aspect of the invention is that the seat lifter device in which, assuming that the pitch angle of the internal tooth of the lock/unlock device is indicated as "C", the rotation speed ratio of the sector gear relative to the pinion gear is indicated as "A" and that the pitch angle of the ratchet wheel is indicated as "B", the pitch angle "C" is represented as $C = A \times B$.

Still further, an aspect of the invention is that lock/unlock device produces the lock condition and the unlock condition by the second rotation member being engaged with the first rotation member fixed to the base frame side and rotatable on the axial center of the torque rod through the bearing portion relative to the first rotation member, the detent member being supported on the first rotation member and movable only in a radial direction and the cam member being rotatably supported on the first rotation member to operate the detent member to advance or retreat in the radial direction, the internal tooth being formed on the second rotation member and engageable with the external tooth formed on the tip end of the detent member and the detent member being moved in the radial direction when the cam member is rotated by the rotating member wherein the external tooth engages with or disengage from the internal tooth.

Further, an aspect of the invention is that lock/unlock device operating mechanism is characterized in that the operating member is provided with the unlock cam for rotating the rotating member to the unlock position by pushing the contacting portion provided at the end portion of the rotating member so that the lock/unlock device is brought into the unlock condition while the operating member is rotated from the neutral position to the first position and the holding cam for holding the lock/unlock device to the unlock position by engaging with the contacting portion so that the lock/unlock device is kept to the lock condition while the operating member is rotated from the first position to the second position, the contacting portion of the rotating member is released from the holding cam to have the rotating member to be rotated to the lock position so that the lock/unlock device returns to the lock condition when the operating member exceeds the second position, the unlock cam is formed by the fixed unlock cam integrally formed on the operating member and the swing unlock cam swingably supported on the operating member and biased to be in contact with the fixed unlock cam and that the contacting portion of the rotating member which has been returned to the lock position operates to swing the swing unlock cam and passes through the fixed unlock cam and the swing unlock cam to face with the swing unlock cam at the initial position when the operating member returns to the neutral position.

BRIEF EXPLANATION OF ATTACHED DRAWINGS

Figure 6:
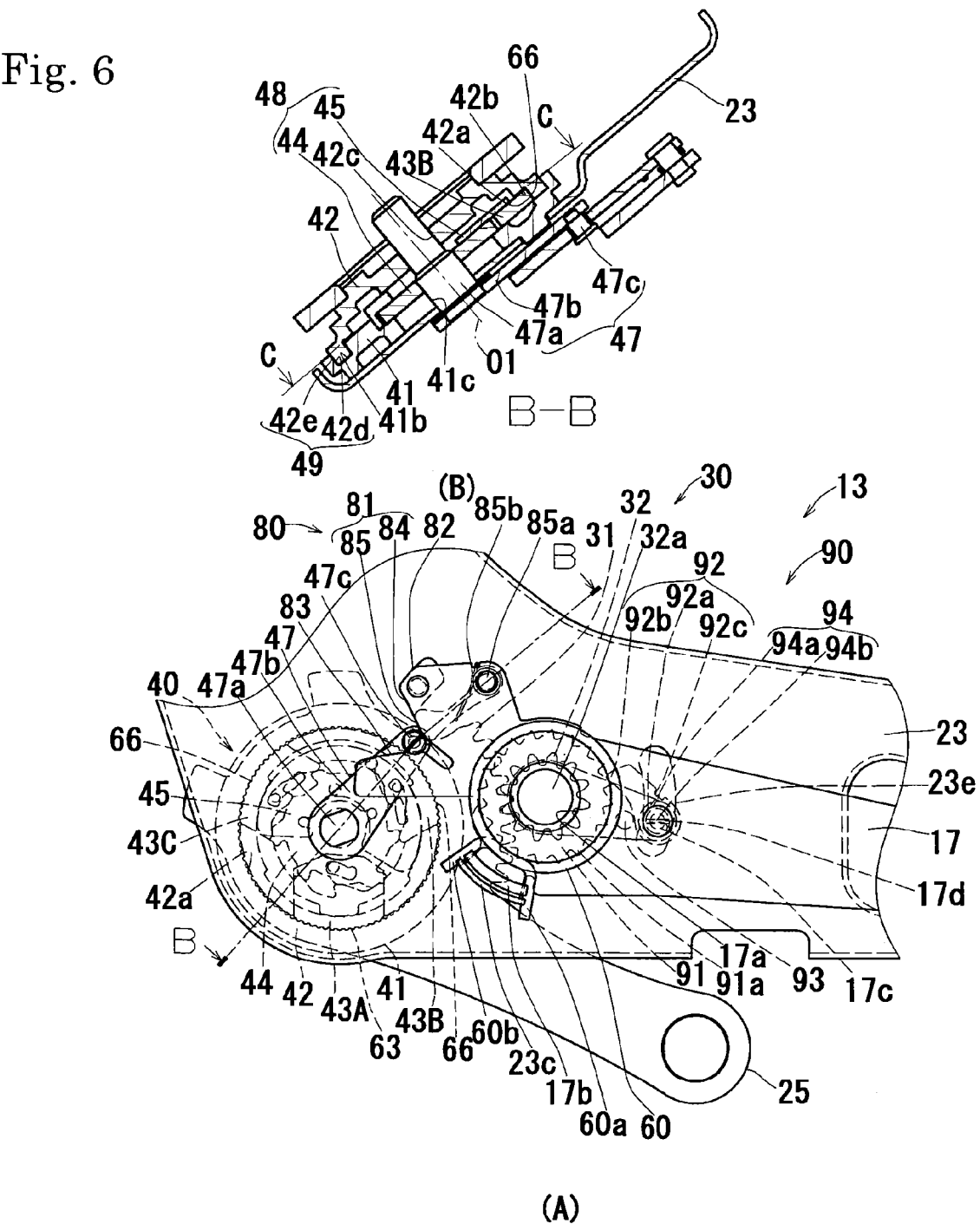

FIGS. 6 (A) and (B) respectively show a side view of the seat lifter device for the vehicle seat according to the first embodiment seen from outside of the base frame and a cross sectional view thereof taken along the line B-B.

FIGS. 7 (A) and (B) are a cross sectional view of the lock/unlock device of the vehicle seat lifter device, showing the lock condition and unlock condition, respectively, taken along the line C-C of FIG. 6 seen from the outside of the base frame.

Figure 8:
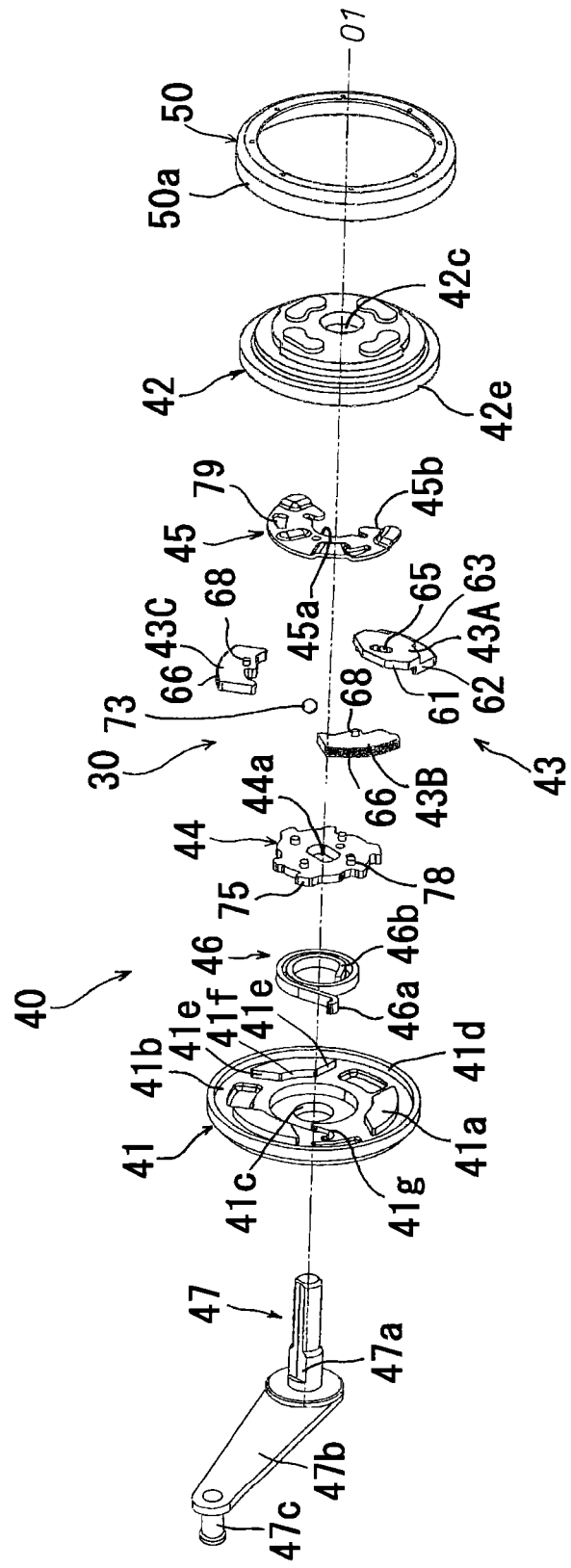

FIG. 8 is an exploded perspective view of the lock/unlock device of FIG. 7.

Figure 9:
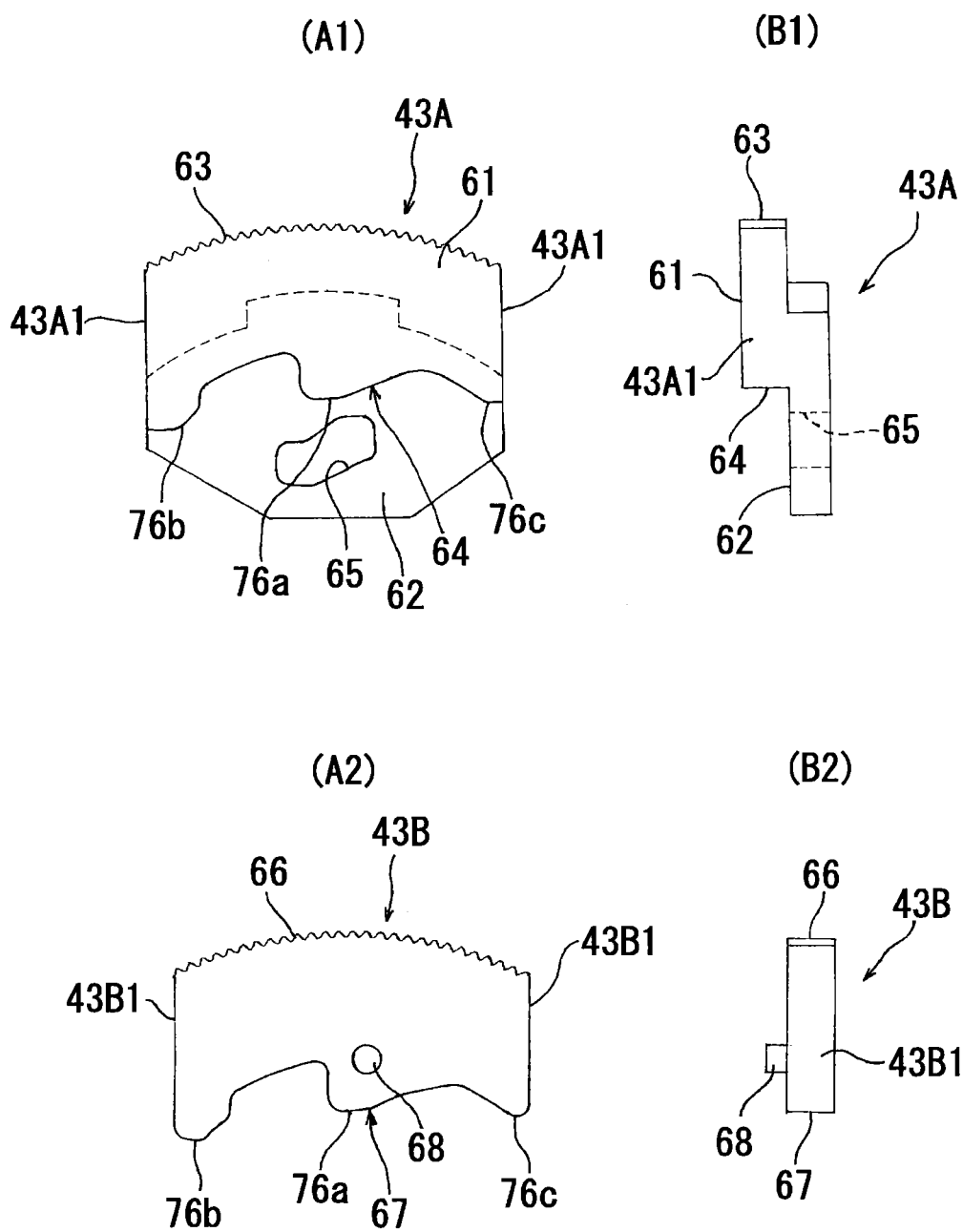

FIGS. 9 (A1) and (B1) show the plane view and side view of the first pawl of the lock/unlock device of the lock/unlock device shown in FIG. 7, FIGS. (A2) and (B2) show the plane view and the side view of the second pawl of the lock/unlock device of the lock/unlock device shown in FIG. 7.

Figure 10:
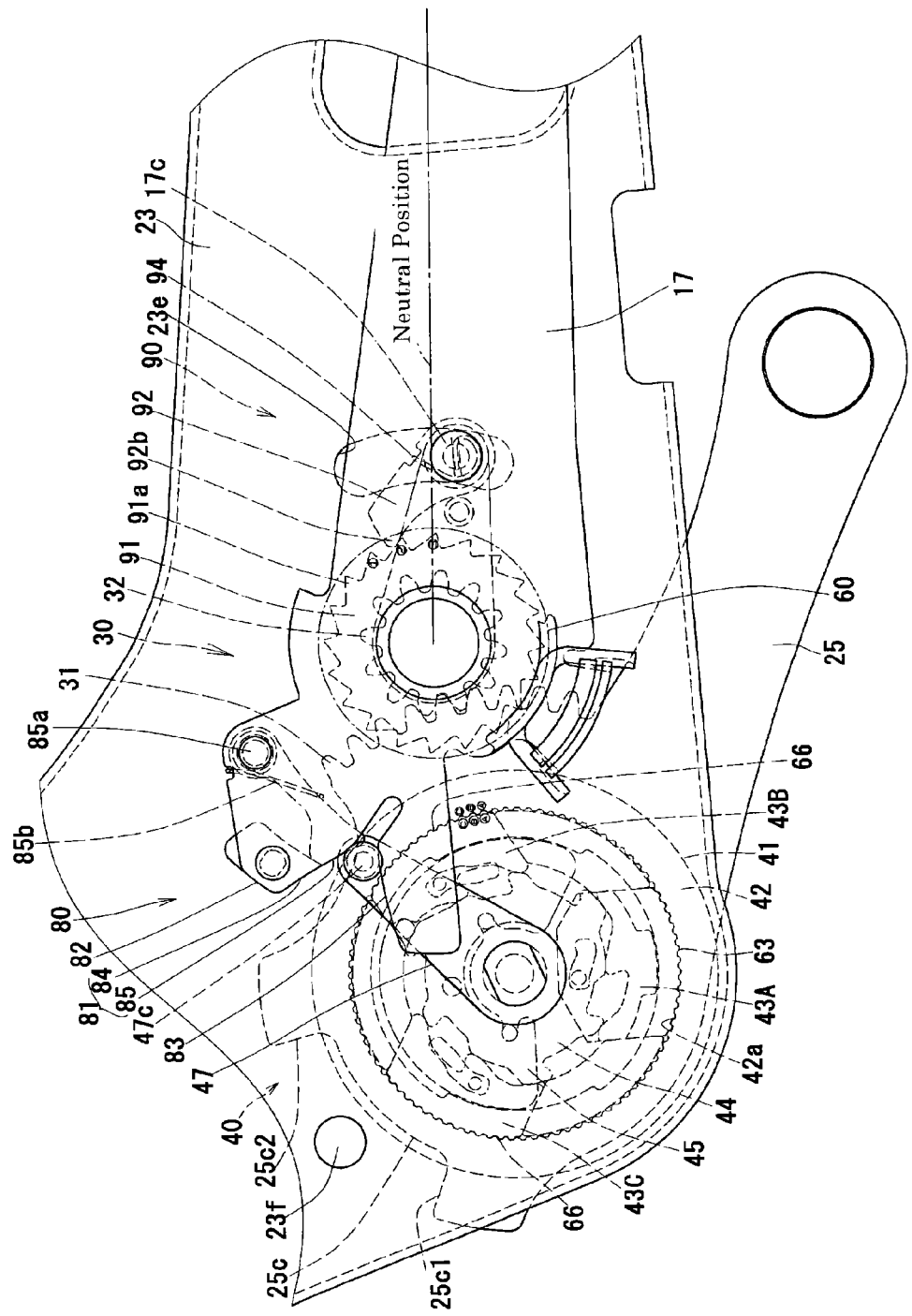

FIG. 10 is a side view of the seat lifter device according to the first embodiment seen from the outside of the base frame when the operating lever is positioned at the neutral position.

Figure 11:
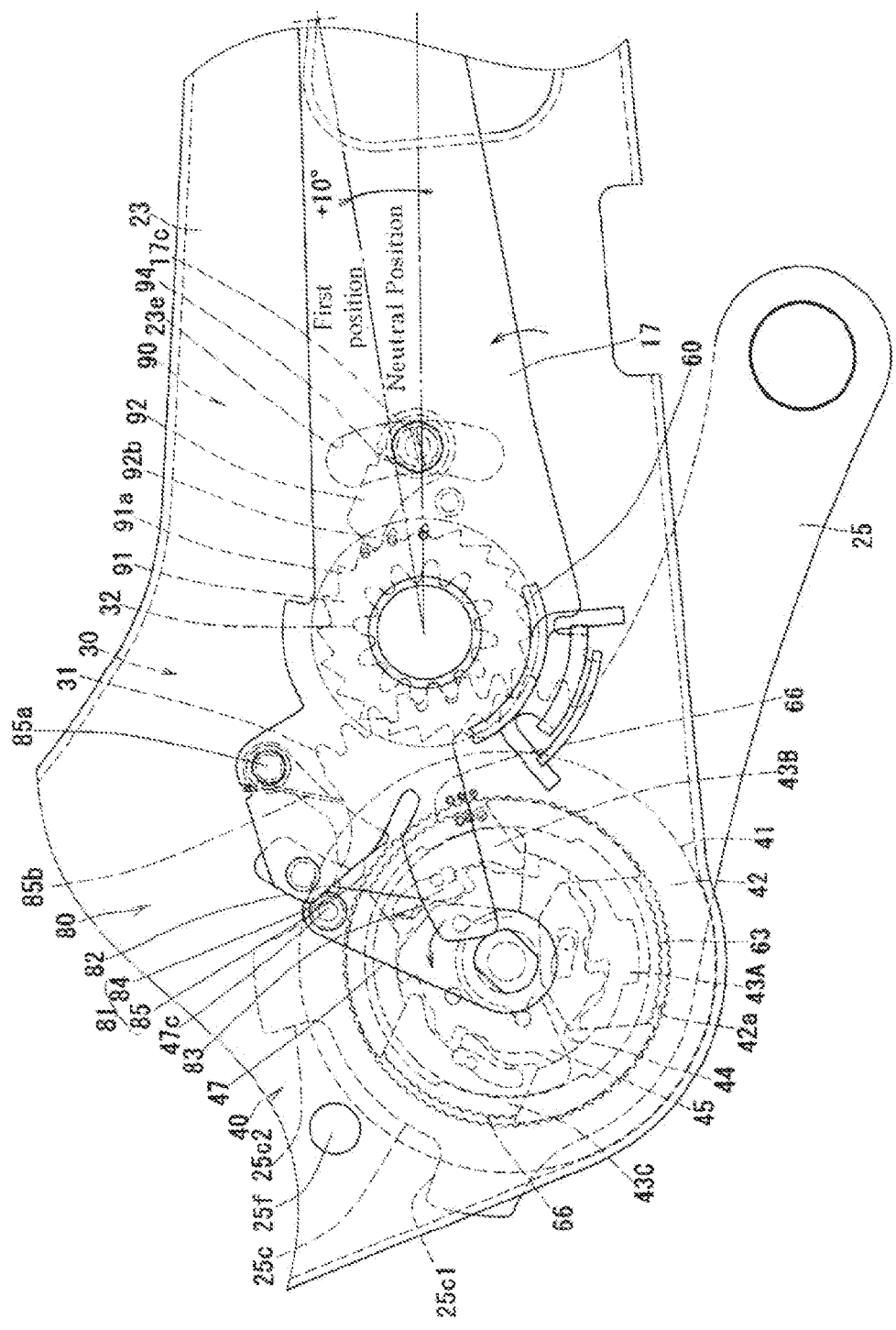

FIG. 11 is a side view of the seat lifter device according to the first embodiment seen from the outside of the base frame when the operating lever is positioned at the first position.

Figure 12:
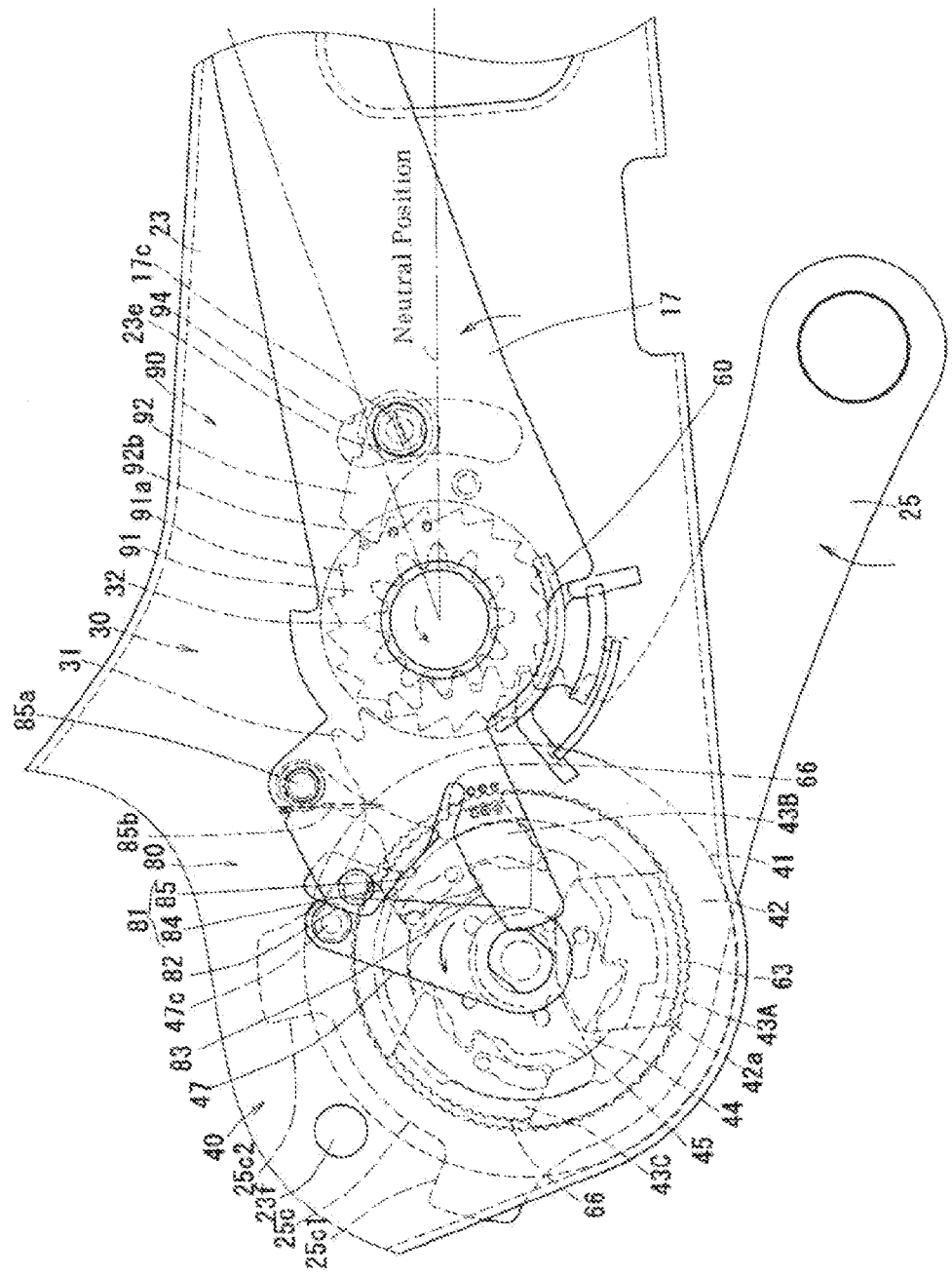

FIG. 12 is a side view of the seat lifter device according to the first embodiment seen from the outside of the base frame when the operating lever is positioned at a position on the way to the first position.

Figure 13:
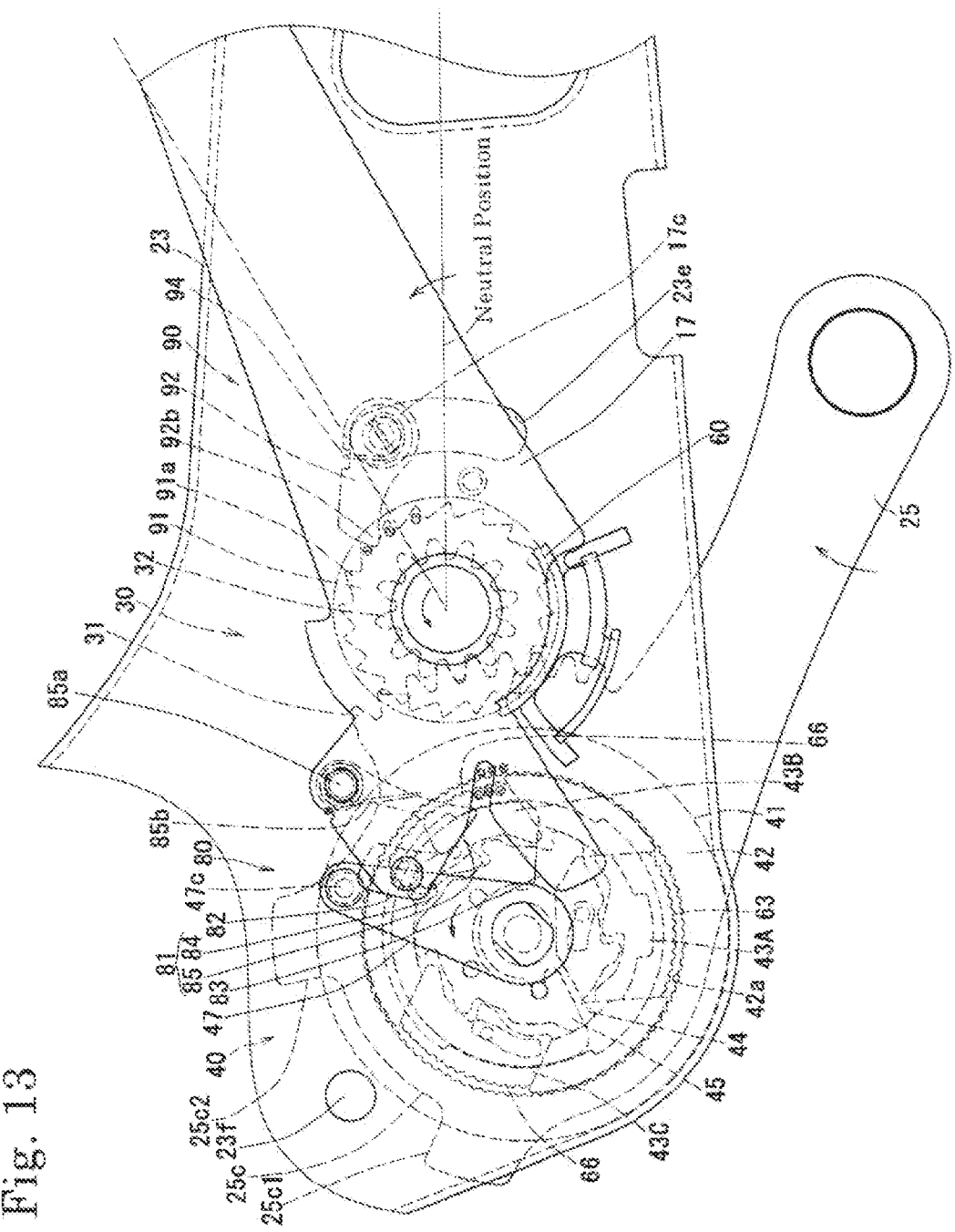

FIG. 13 is a side view of the seat lifter device according to the first embodiment seen from the outside of the base frame when the operating lever is positioned at a position on the way to the first position.

Figure 14:
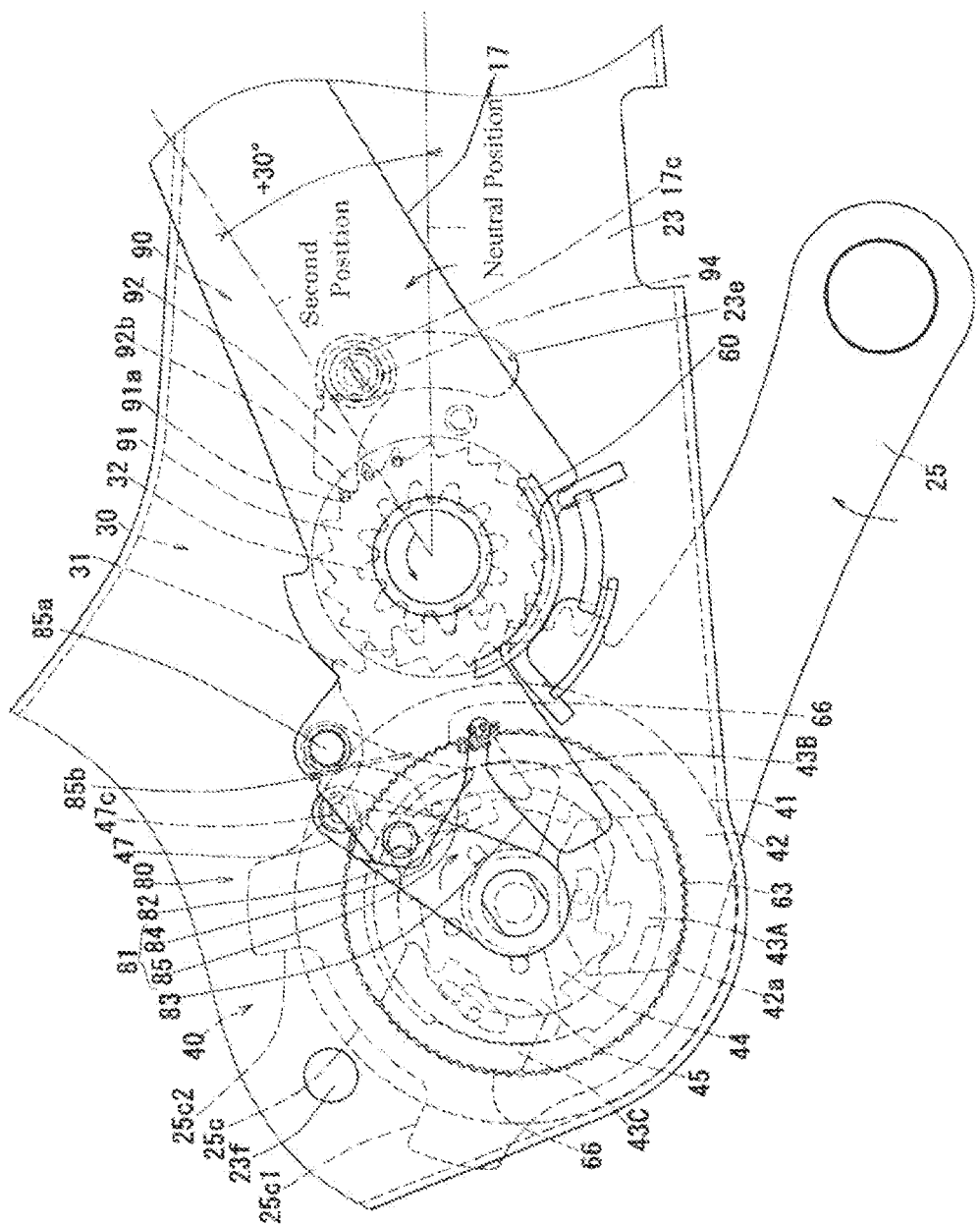

FIG. 14 is a side view of the seat lifter device according to the first embodiment seen from the outside of the base frame when the operating lever is positioned at the second position.

Figure 15:
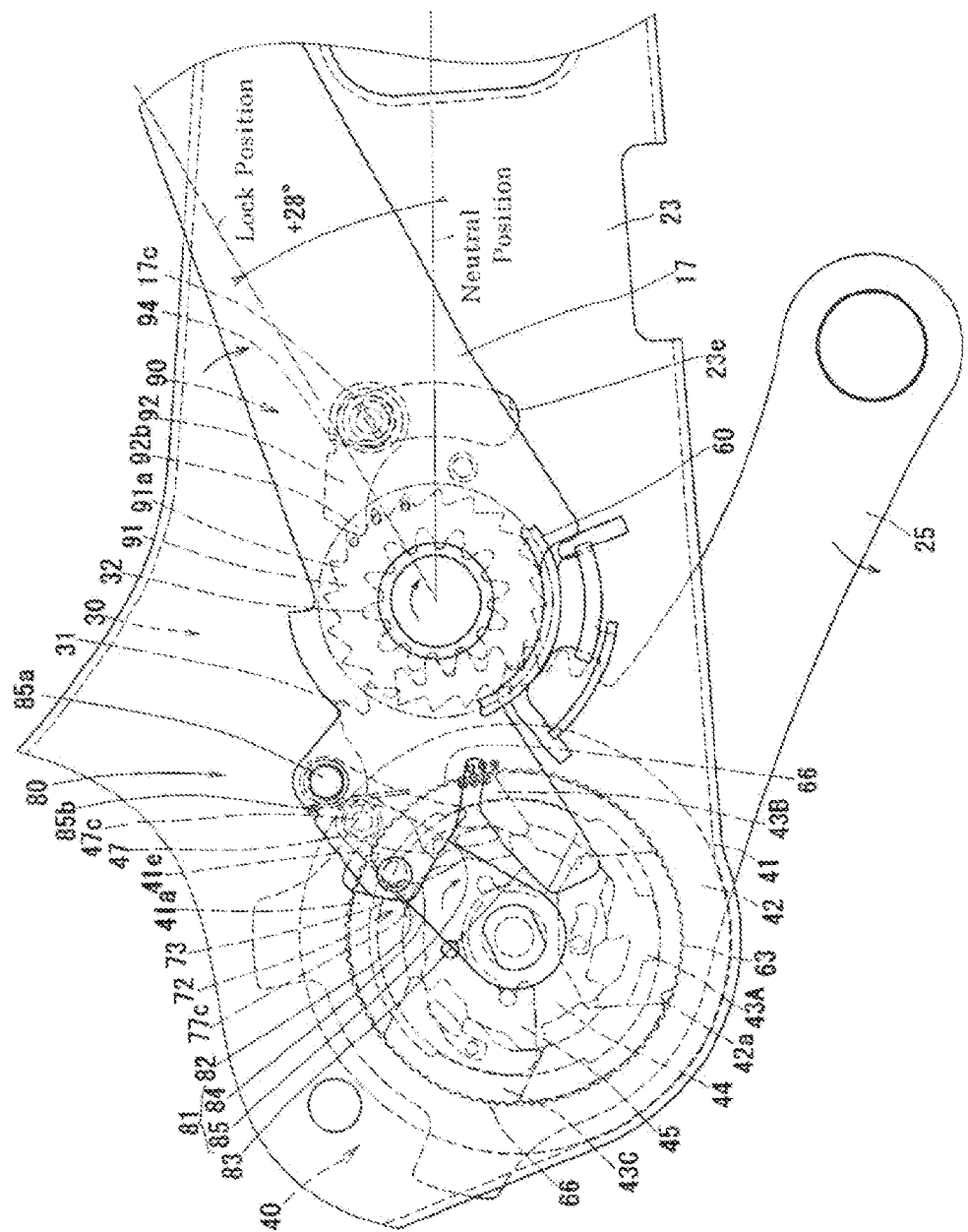

FIG. 15 is a side view of the seat lifter device according to the first embodiment seen from the outside of the base frame when the operating lever is positioned at the lock position.

Figure 16:
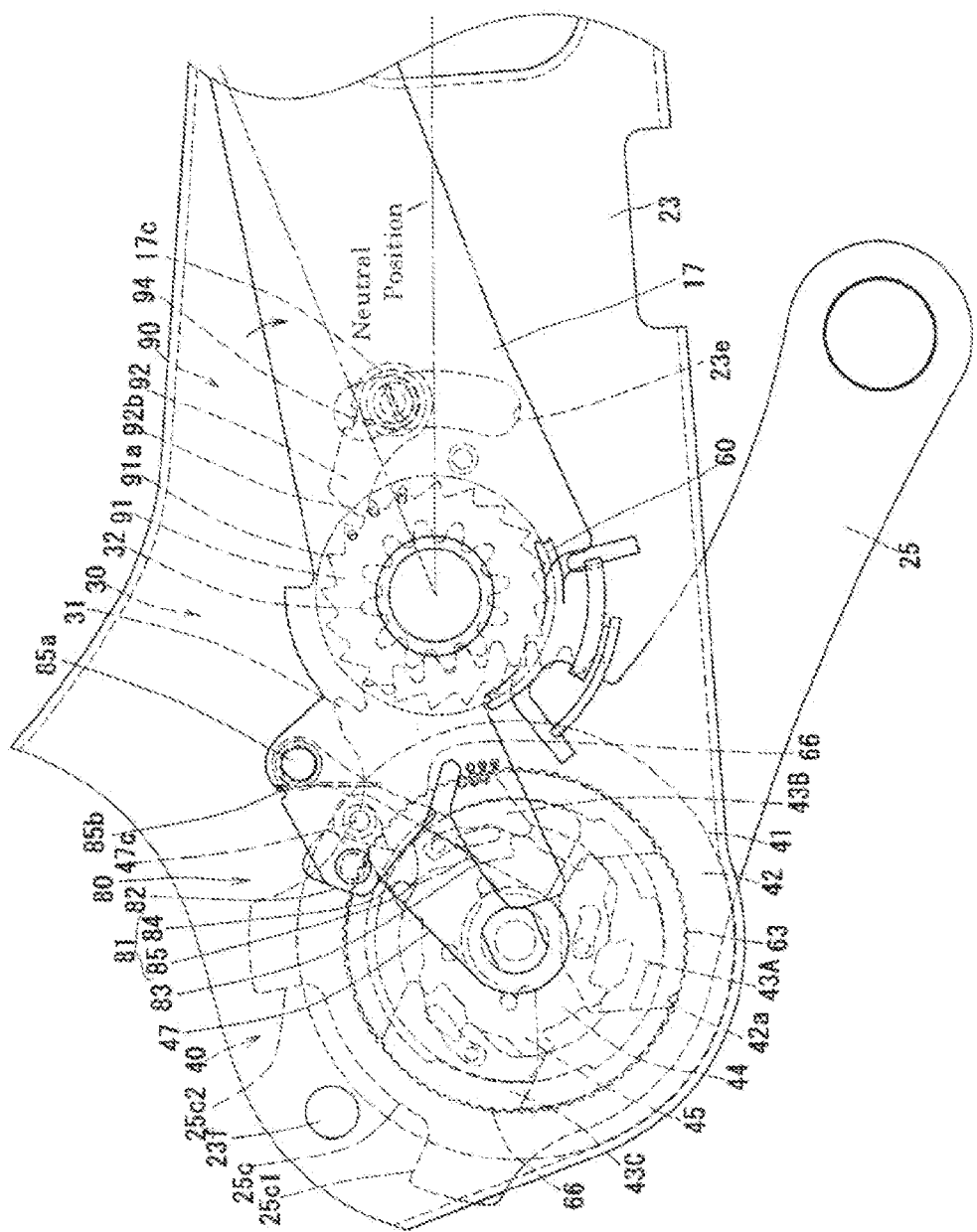

FIG. 16 is a side view of the seat lifter device according to the first embodiment seen from the outside of the base frame when the operating lever is positioned at a position on the way of returning to the neutral position.

Figure 17:
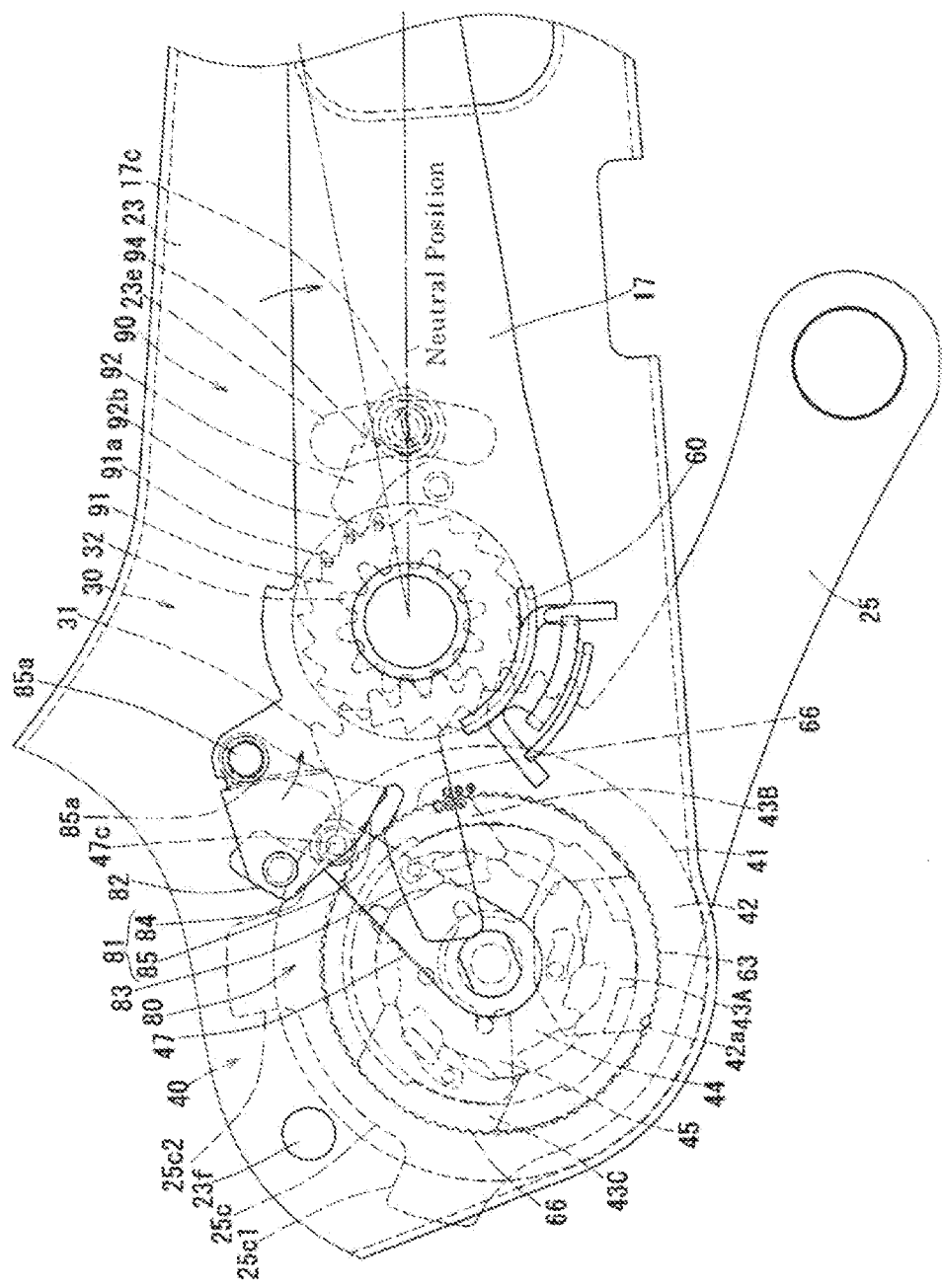

FIG. 17 is a side view of the seat lifter device according to the first embodiment seen from the outside of the base frame when the operating lever is positioned at further downward position from the position of FIG. 16.

Figure 18:
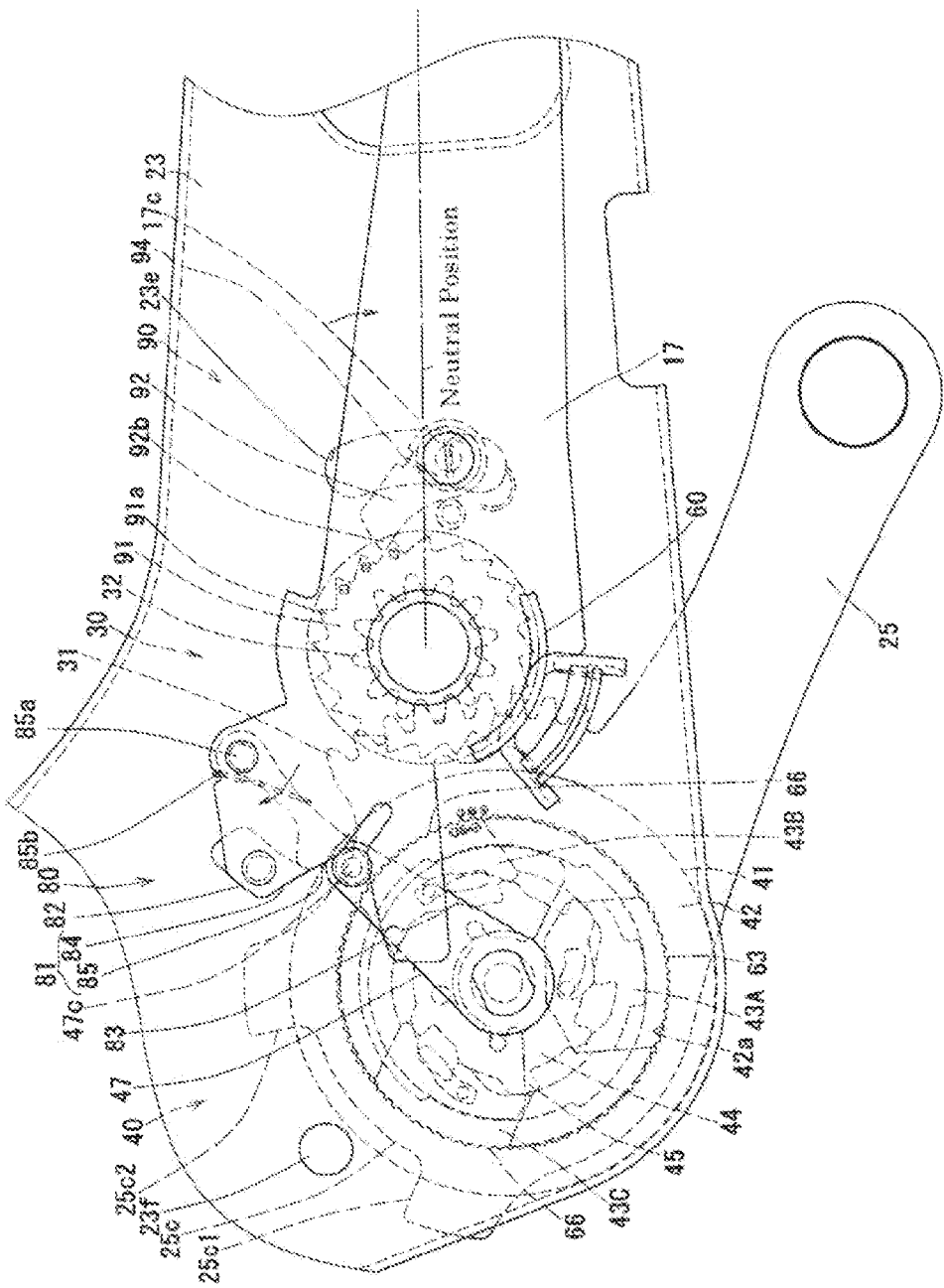

FIG. 18 is a side view of the seat lifter device according to the first embodiment seen from the outside of the base frame when the operating lever has been returned to the neutral position.

Figure 19:
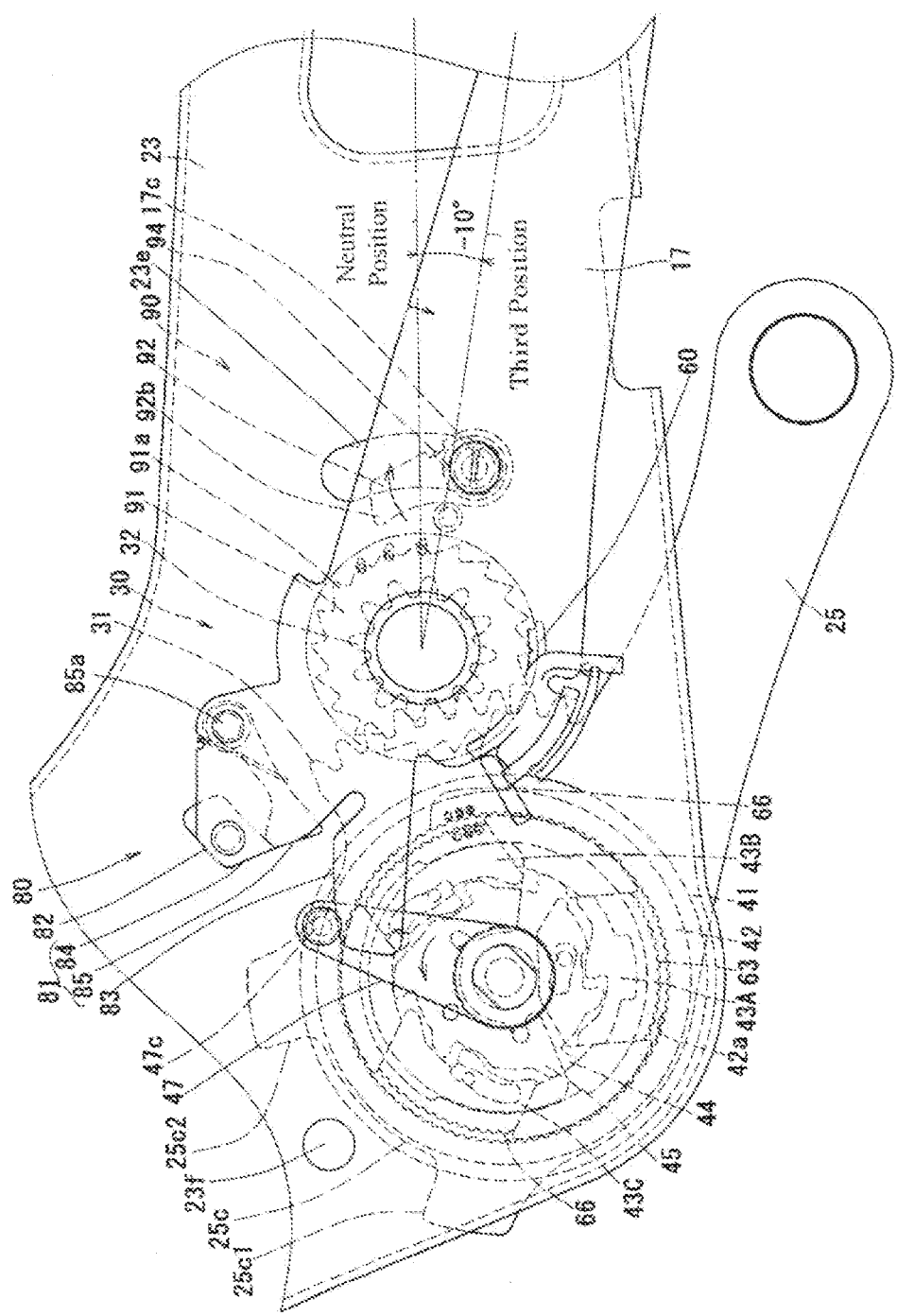

FIG. 19 is a side view of the seat lifter device according to the first embodiment seen from the outside of the base frame when the operating lever is positioned at the third position.

Figure 20:
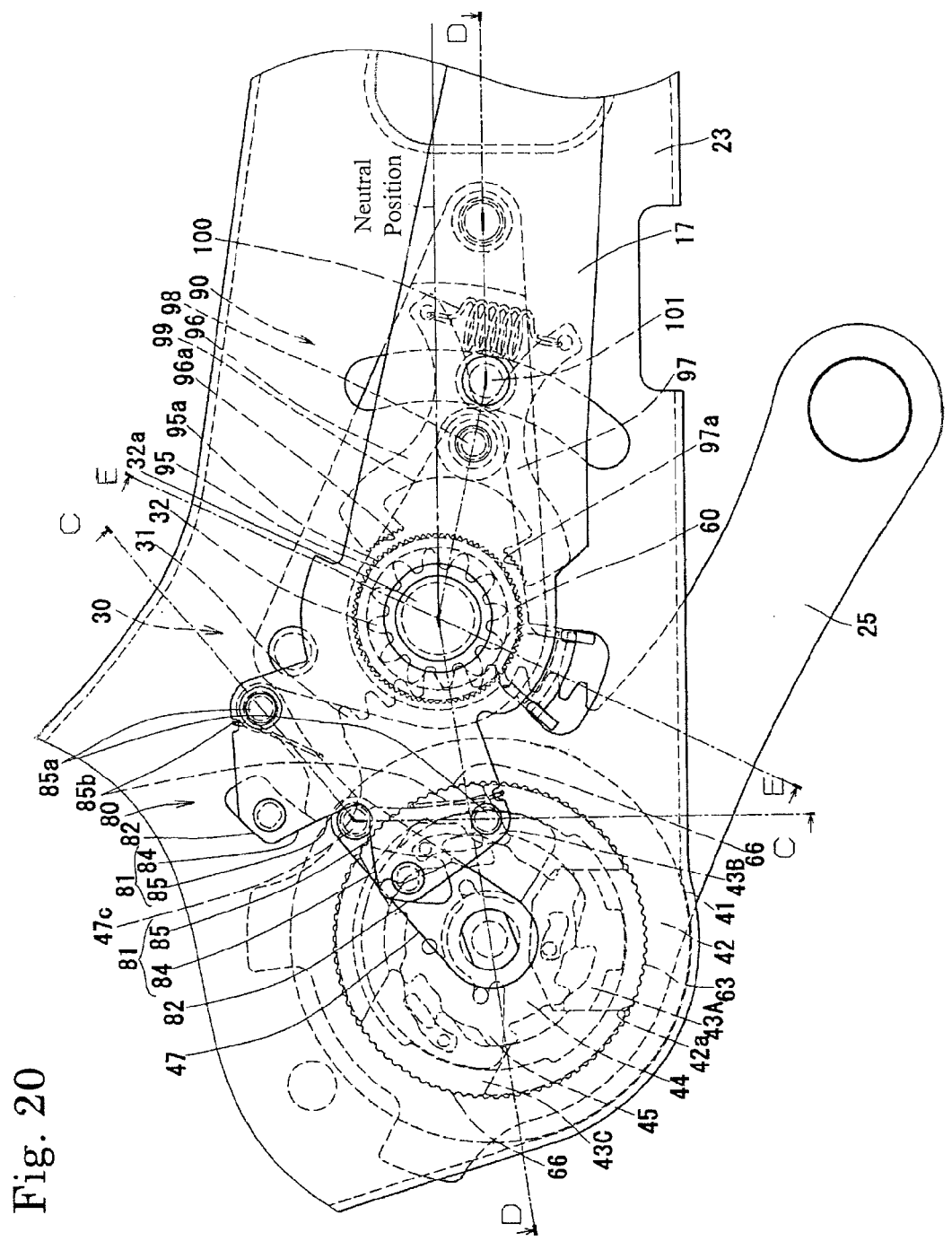

FIG. 20 is a side view of the seat lifter device according to a second embodiment seen from the outside of the base frame.

Figure 21:
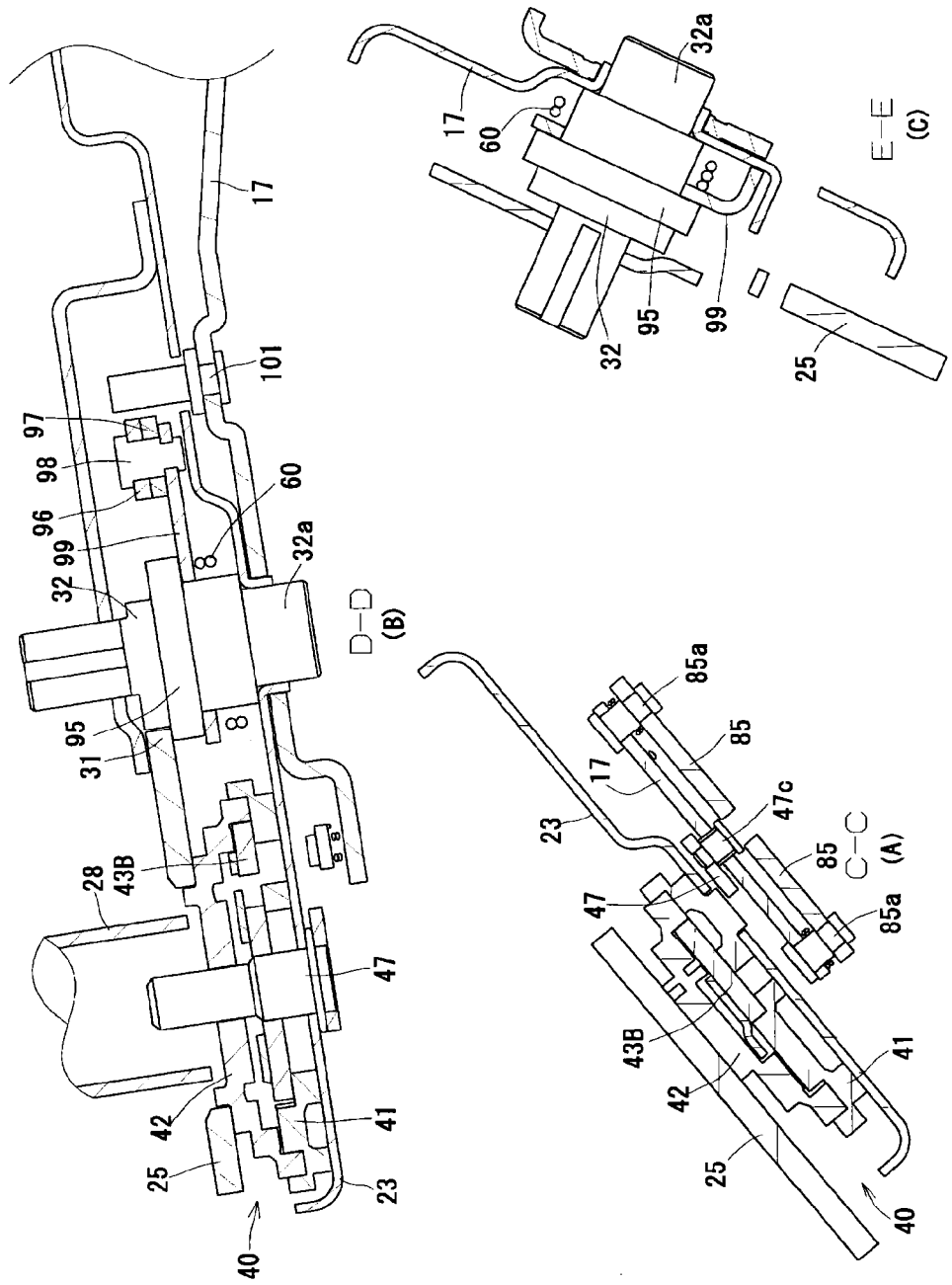

FIGS. 21 (A), (B) and (C) are a cross sectional view of the seat lifter device shown in FIG. 20, taken along the line C-C, a cross sectional view taken along the line D-D and a cross sectional view taken along the line E-E, respectively.

THE EMBODIMENTS OF THE INVENTION

Figure 1:
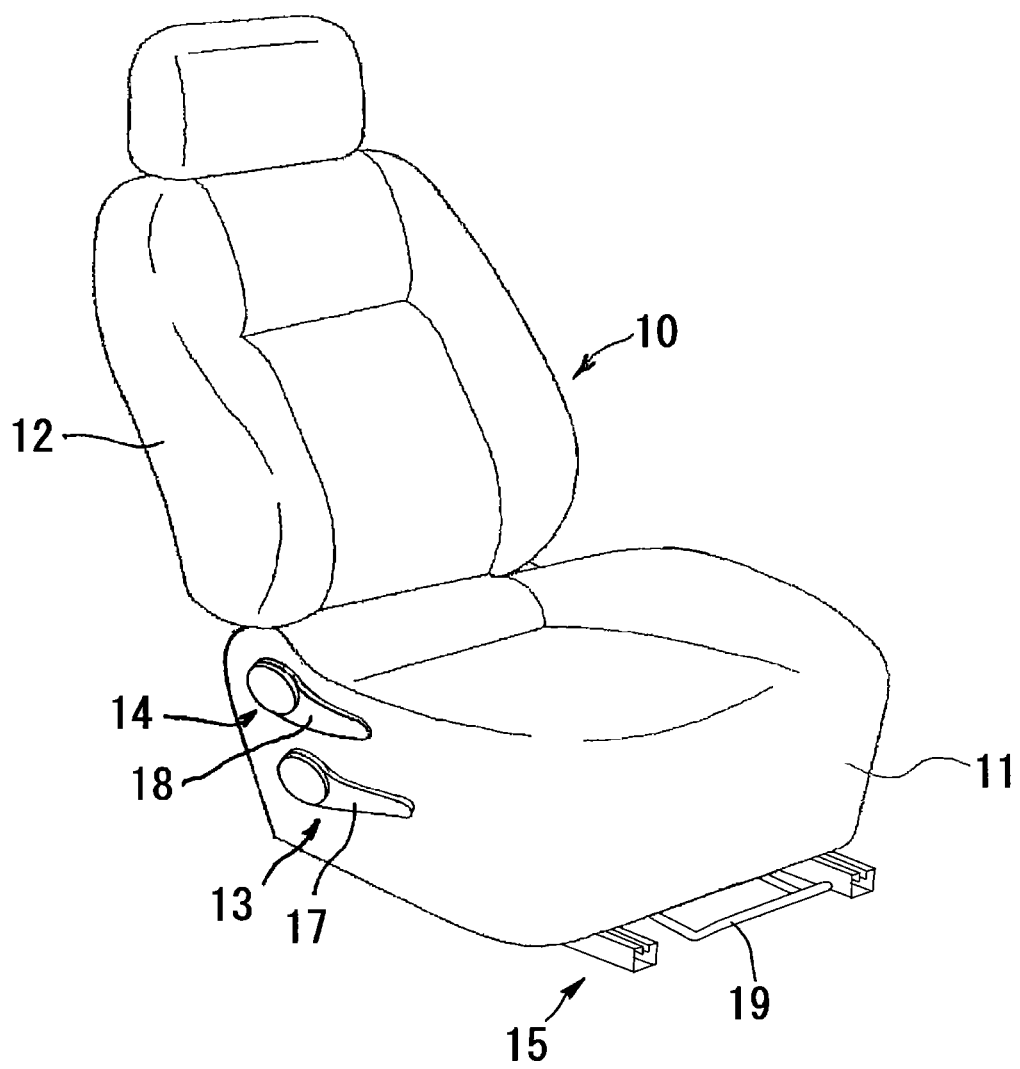
FIG. 1 is a perspective view of a vehicle seat equipped with a seat lifter device according to the invention.

The embodiments of the present invention will be explained with reference to the attached drawings. FIG. 1 shows a view of the vehicle seat 10 equipped with a seat lifter device for a vehicle. The vehicle seat 10 includes a seat cushion 11 forming a seating surface and a seat back 12 forming a back surface of the seat. The vehicle seat 10 includes a seat lifter device 13 for adjusting the height of the seat cushion 11, a seat reclining device 14 for adjusting the inclination angle of the seat back 12 relative to the seat cushion and a seat slide adjuster device 15 for adjusting the front/rearward position of the seat cushion 11.

The height of the seat cushion 11 can be adjusted by operating an operating lever 17 (as an operating member) provided at one side of the seat cushion 11. The inclination angle of the seat back 12 can be adjusted by operating an operating lever 18 provided at the one side of the seat cushion apart from the position of the operating lever 17. The front/rearward position of the seat cushion 11 can be adjusted by operating an operating lever 19 provided at a lower portion of the seat cushion 11.

Figure 2:
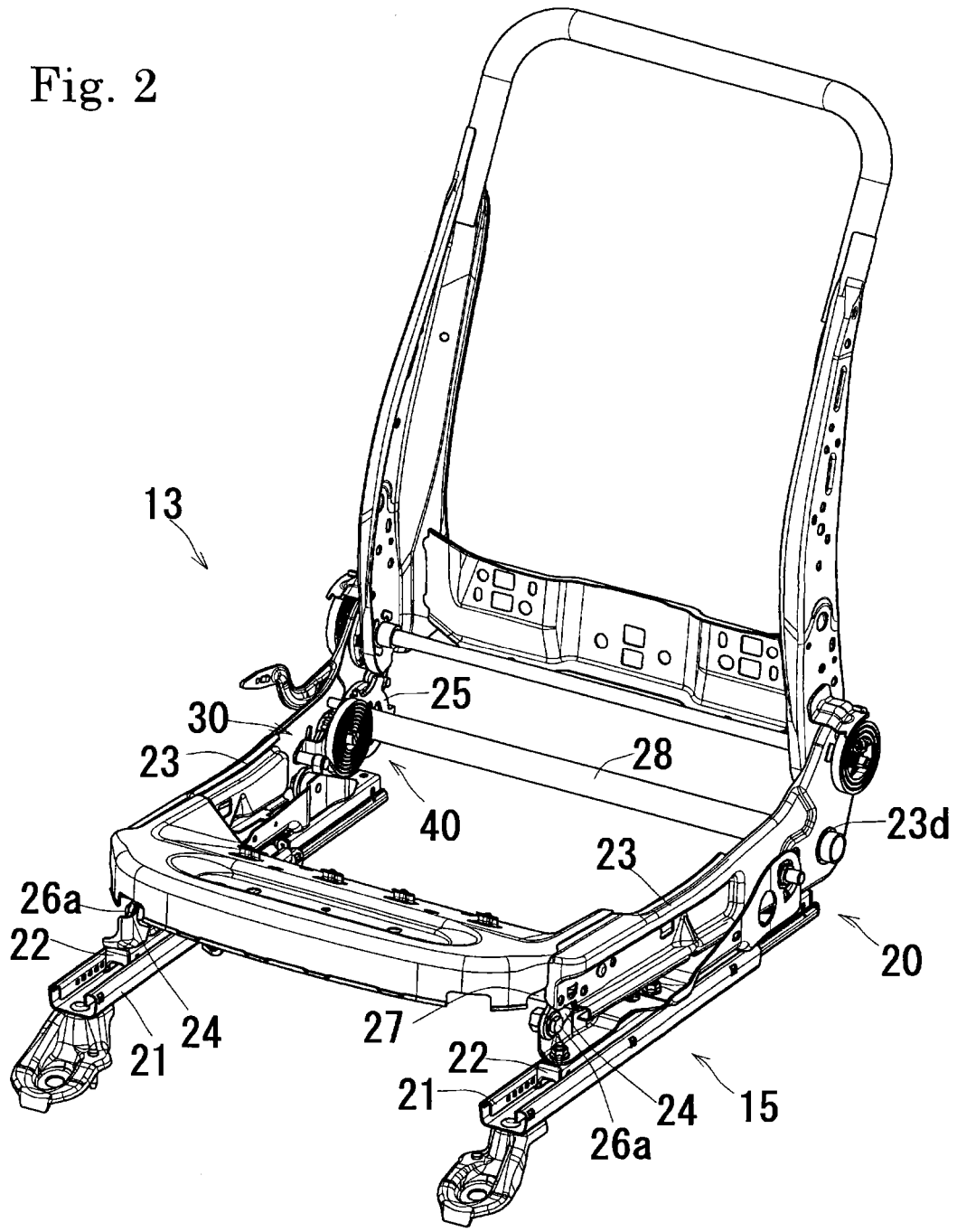
FIG. 2 is a perspective view of the vehicle seat of FIG. 1 but showing a view that the seat cushion has been removed.

FIG. 2 shows the vehicle seat 10, but showing the condition that the cushion portion of the seat cushion 11 and the cushion portion of the seat back 12 have been removed. The seat lifter device 13 is provided on the seat slide adjuster device 15. The seat slide adjuster device 15 includes a pair of right and left lower rails 21 fixed to a vehicle floor and a corresponding pair of upper rails 22 engageable with the lower rails and slidable in a vehicle front/rearward direction. The upper rails 22 can be locked at predetermined positions in the vehicle front/rearward direction by a lock mechanism (not shown).

As shown in FIGS. 2 though 5, the seat lifter device 13 includes a pair of right and left base frames 23 forming a part of the seat cushion 11 and a pair of right and left front link members 24 and a pair of right and left rear link members 25 to connect the base frames 23 to the right and left upper rails 22 to be relatively movable in an upper and lower direction. Further, the seat lifter device 13 includes a rotation device 30 for relatively rotating the base frames 23 and the rear link members 25, a lock/unlock device 40 for locking or unlocking the relative rotation between the base frames 23 and the rear link members 25, the operating lever 17, a lock/unlock device operating mechanism 80 for operating the lock/unlock device 40 and a rotation device driving mechanism 90 for driving the rotation device 30 to rotate.

Figure 5:
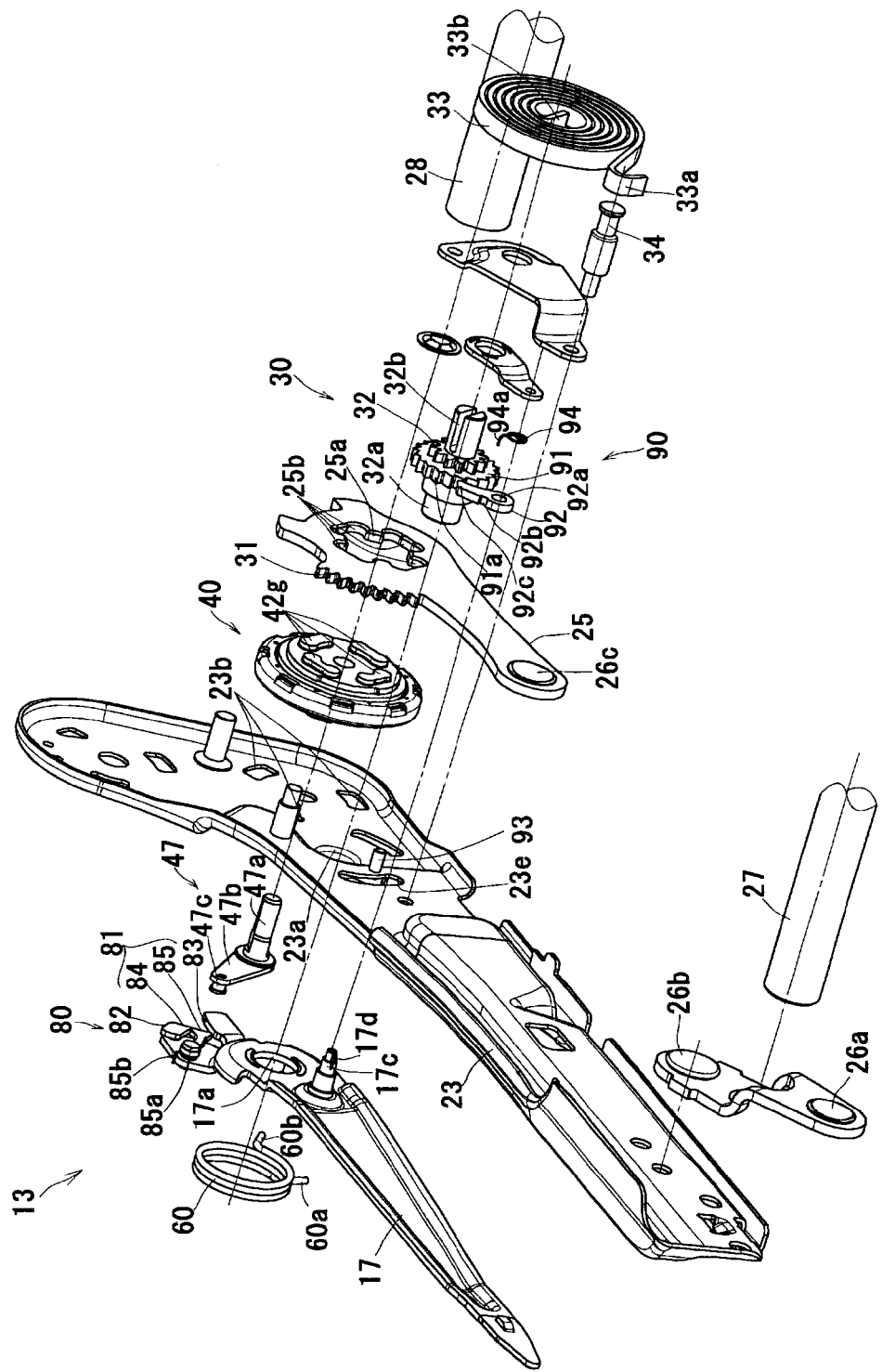
FIG. 5 is an exploded perspective view of the seat lifter device for the vehicle seat according to the first embodiment.

Each lower end of the pair of front link members 24 is pivoted for rotation to each front end of the pair of upper rails 22 through hinge pin 26a (See FIG. 2 and FIG. 5). Each upper end of the pair of front link members 24 is pivoted for rotation to each front end of the pair of base frames 23 through hinge pin 26b (See FIG. 5). Each middle portion of the pair of front link members 24 is connected to each other by a connecting rod 27 (See FIG. 5).

Figure 3:
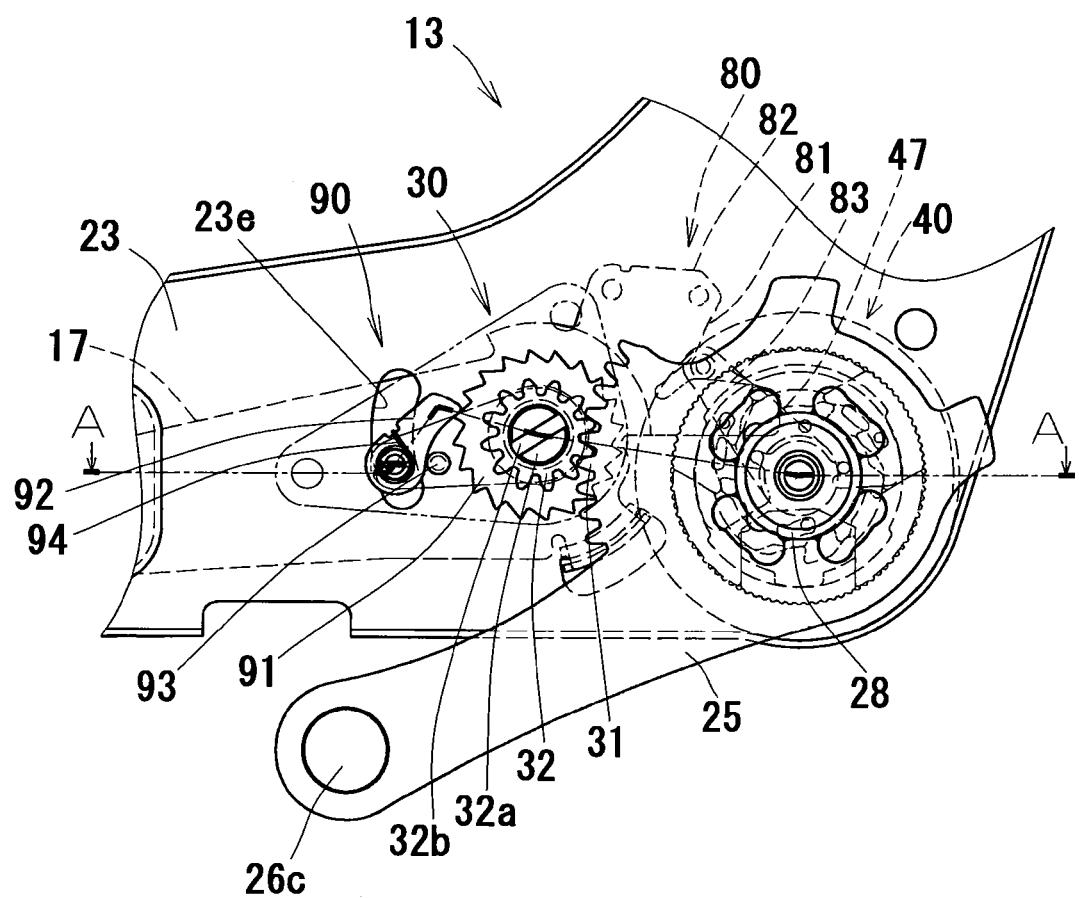
FIG. 3 is a side view of the seat lifter device for the vehicle seat seen from the inside of the base frame according to a first embodiment of the invention.
Figure 4:
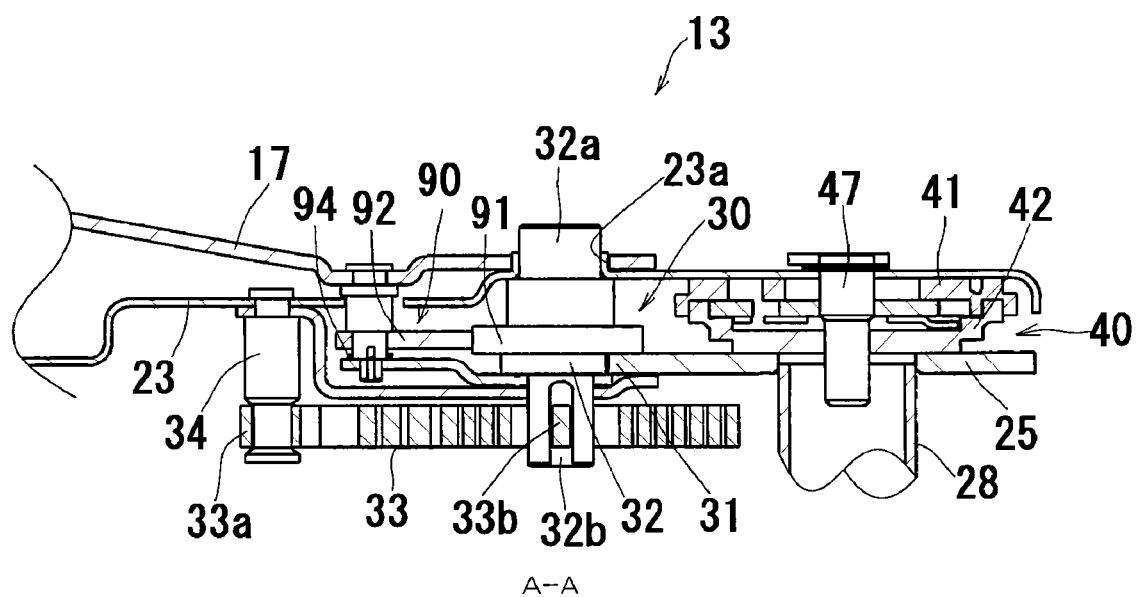
FIG. 4 is a cross sectional view of the seat lifter device for the vehicle seat taken along the line A-A of the first embodiment of the invention.

Each lower end of the pair of rear link members 25 is pivoted for rotation to each rear end of the pair of upper rails 22 through hinge pin 26c (See FIG. 3 and FIG. 5). Each end of a cylindrical torque rod 28 formed by a pipe material is inserted into each upper end of the pair of rear link members 25 and connected to the rear link members 25 at both ends by welding or the like. One end of the torque rod 28 is rotatably supported on the lock/unlock device 40 and the other end of the torque rod 28 is rotatably supported in the bearing bore 23d (See FIG. 2) formed at the other of the pair of base frames 23. In other words, as shown in FIGS. 4 and 5, the lock/unlock device 40 is provided at the one end of the torque rod 28 and arranged coaxially with the torque rod 28. The lock/unlock device 40 is disposed between the one end of the torque rod 28 and the one of the base frames 23 in which side the operating lever 17 is provided.

The one of the rear link members 25 fixed to the one end side of the torque rod 28 forms the driving side link member 25 (hereinafter referred to as "driving side rear link member 25") which is operated by the operating lever 17 and the other rear link member 25 forms the driven side link member to which a torque is transmitted through the torque rod 28. The front and rear link members 24, 25, base frames 23 and the upper rails 22 form a parallel link mechanism 20 (See FIG. 2) thereby to move the base frames 23 approximately in parallel in up and down direction.

As shown in FIGS. 3 through 5, the rotation device 30 includes a sector gear 31 integrally formed with the driving side rear link member 25, a pinion gear engaged with the sector gear 31 and rotatably supported on the base frame 23 and a lift spring 33 (See FIGS. 4 and 5) as a base frame upward biasing means, one end of which is engaged with the base frame 23 and the other end of which is engaged with the pinion gear 32 so that the base frame 23 can be moved in upward direction by a spring biasing force.

The sector gear 31 is provided at the outer peripheral front side of the rotation end side of the driving side rear link member 25. The pinion gear 32 is rotatably inserted into the bearing bore 23a (See FIGS. 4 and 5) provided at the base frame 23 at one end of the rotation shaft 32a and engaged with the sector gear 31. The lift spring 33 is formed by a spiral spring wound in a clockwise direction from the inside towards outer periphery side seen from the inside of the base frame 23 as shown in FIG. 5. The outer peripheral end portion 33a of the lift spring 33 is engaged with one end of the engaging pin 34 provided at the inner side surface of the base frame 23 and the inner peripheral end portion 33b of the lift spring 33 is engaged with a slit 32b which is provided at the other side of the rotation shaft 32a of the pinion gear 32 and extends in an axial direction.

As shown in FIGS. 6 through 8, the lock/unlock device 40 includes a disc shaped first rotation member 41, a disc shaped second rotation member 42 formed with an internal tooth 42a at the inner peripheral surface and engaged with the first rotation member 41 for relative rotation, a first, a second and a third pawl 43A, 43B and 43C as three detent members formed in a circle on three points supported on and guided by the first rotation member 41 movably in a radial direction and having an external tooth 63 engageable with or disengageable from the internal tooth 42a, a cam member 44 and a release plate 45 rotatable between the lock position and the release position and operating the first, second and third pawls 43A, 43B and 43C between the engaging position with the internal tooth 42a of the second rotation member 42 and the non-engaging position with the internal tooth 42a of the second rotation member 42, a lock spring 46 (See FIG. 8) for rotatably biasing the cam member 44 towards the lock position side and a rotating member 47 for operating the cam member 44 to rotate between the lock position and the released position. The cam member 44 and the release plate 45 form an engagement/disengagement mechanism 48 (See FIG. 6) which restricts or allow the relative rotation between the first and the second rotation members 41 and 42 by engaging or disengaging the each pawl 43A, 43B and 43C movably supported on the first rotation member 41 with or from the second rotation member 42.

As shown in FIGS. 6 and 8, the first rotation member 41 is provided with a circular recessed portion 41b formed by half blanking and open to the second rotation member 42 side. The recessed portion 41b is formed with a penetrating bore 41c at the central portion. The circular recessed portion 41b has an inner peripheral surface 41d centering on the rotational axis line O1 of the first and the second rotation members 41 and 42. On the other hand, as shown in FIGS. 6 and 7, the second rotation member 42 is provided with a circular recessed portion 42b formed by half blanking and open to the first rotation member 41 side. The recessed portion 42b is formed with a penetrating bore 42c at the central portion. The circular recessed portion 42b has an inner peripheral surface 42d centering on the rotational axis line O1 of the first and the second rotation members 41 and 42. The internal tooth 42a is formed on the inner peripheral surface in full circle.

As shown in FIG. 6, the inner peripheral surface 41d of the first rotation member 41 is slidably inserted into the outer peripheral surface 42e of the second rotation member 42 in a circumferential direction. Thus the first and the second rotation members 41 and 42 are relatively rotatably fit together centering on the axial center of the torque rod 28. The bearing portion is formed between the inner peripheral surface 41d of the first rotation member 41 and the outer peripheral surface 42e of the second rotation member 42, which is commonly used as the bearing portion of the one end side of the torque rod 28, which will be later explained in detail. As shown in FIG. 8, three guide walls 41a are provided with an equal interval separated with one another in a circle within the circular recessed portion 41d of the first rotation member 41 and a pair of guide surfaces 41e is provided between the adjacent two guide walls 41a facing with each other and in parallel to slidably guide both width portions of three pawls 43A, 43B and 43C. A circular arc surface 41f is formed on the inner periphery of the guide walls 41a centering on the rotational axis line O1.

As shown in FIG. 6, the second rotation member 42 is relatively rotatably supported on the first rotation member 41 through the bearing portion 49 formed between the inner peripheral surface 41d of the first rotation member 41 and the outer peripheral surface 42e of the second rotation member 42. As shown in FIG. 8, a ring holder 50 made from a metal plate is fixed on the outer peripheral portion of the first rotation member 41 by welding or the like. The ring holder 50 includes a bent portion 50a bent with approximately a right angle towards the end surface of the second rotation member 42 and by this bent portion 50a, the first and the second rotation members 41 and 42 are prevented from axial movement, allowing the relative rotation.

As shown in FIGS. 7 and 8, the first, second and third pawls 43A, 43B and 43C are formed by two different kinds of pawls arranged with an equal angle separated with one another in a circle within a surface intersecting the rotational axis line O1. The first pawl 43A is formed by forging a steel material and is formed with a first block 61 and a second block 62 having a step with the first block 61 as viewed from the side, which structure is shown in FIGS. 9 (A1) and (B1) in detail. As shown in FIG. 8, the first block 61 of the first pawl 43A is arranged at the inner peripheral surface 42d side of the second rotation member 42 and the second block 62 is arranged at the axial center side of the second rotation member 42.

As shown in FIGS. 9 (A1) and (B1), the both width side ends 43A1 of the first and the second blocks 61 and 62 agree to each other to form two parallel straight lines. The outer end (end surface facing the internal tooth 42a of the second rotation member 42) of the first block 61 is formed with an external tooth 63 which is engageable with the internal tooth 42a of the second rotation member 42 and the inner end (opposite direction to the outer end) of the first block 61 is formed with an inner surface cam portion 64 which is engageable with the outer peripheral surface of the cam member 44. Further, a pawl side groove cam portion 65 is provided at the second block 62 and penetrating through the second block 62 in a thickness direction. The cam portion 65 is formed through at approximately the center portion in a width direction of the second block 62.

On the other hand, the second and the third pawls 43B and 43C are formed by press-machining a steel plate. As shown in FIGS. 9 (A2) and (B2), the second pawl 43B is of flat shape similar to the first pawl 43A with the second block 62 being cut away and with only the first block 61, which means the second pawl 43B has no step without the second block 62. In other words, the length in a radial direction of the second and the third pawls 43B and 43C is shorter by the length of the second block 62 with respect to the length of the first pawl 43A and the thickness in a width direction is also thinner by the thickness of the second block 62 than the thickness of the first pawl 43A.

As shown in FIGS. 9 (A2) and (B2), the both width side ends 43B1 of the second and the third pawls 43B and 43C are formed to be two parallel straight lines as similar to those of the first pawl 43A. The outer end of each second and third pawls 43B and 43C is provided with an external tooth 66 which is engageable with the internal tooth 42a of the second rotation member 42. The second and the third pawls 43B and 43C are provided with an inner surface cam portion 67 which engages with the outer peripheral surface of the cam member 44 and further provided with an engaging projection 68 at the central portion in an axial direction.

The cam profile of the inner surface cam portion 64 formed at the stepped portion of the first pawl 43A is the same with the cam profile of the inner surface cam portion 67 formed at the inner end side of the second pawl 43B. In other words, as shown in FIGS. 9 (A1) and (A2), the inner surface cam portions 64 and 67 are provided with three pushing portions 76a, 76b and 76c to which the cam face 75 (later explained) of the cam member 44. One of three portions is provided at the central portion in a circular direction and the other two are provided at both sides in the circular direction of the first and the second pawls 43A and 43B.

The pushing portion 76a provided at the central portion of the first and the second pawls 43A and 43B and the pushing portion 76b provided at the deeper side of the locking rotation direction of the cam member 44 are formed to be a cam face with an inclined surface which approaches to the cam face 75 of the cam member 44 as the cam member 44 rotates in a locking rotation direction (counterclockwise direction a viewed in FIG. 7). The pushing portion 76c provided at the front side of the locking rotation direction of the cam member 44 is formed to be a circular arc surface centering on the rotation center of the cam member 44. On the other hand, the third pawl 43C is formed to be approximately the same with the second pawl 43B, but the third pawl 43C is different in structure from the second pawl 43B that a wedge function portion 72 (See FIG. 7) is provided, instead of providing the pushing portion 76c of the second pawl 43B.

The first, the second and the third pawls 43A, 43B and 43C are guided on the guide surface 41e of the guide wall 41a formed in the circular recessed portion 41b of the first rotation member 41 and slidably moved in a radial direction of the first and the second rotation members 41 and 42. The pawls 3A, 43B and 43C are engaging or disengaging the external teeth 63 and 66 with or from the internal tooth 42a. An inclined surface 71 (FIG. 7) is provided at one side surface of the front side of the rotation direction of the cam member 44 facing to the guide surface 41e of the guide wall 41a. The inclined surface 71 has a straight line shape and the width thereof becomes consequently narrower towards outward in a radial direction.

In other words, the distance between the inclined surface 71 and the guide surface 41e of the guide wall 41a becomes gradually narrower towards outward in a radial direction to form a wedge function portion 72 in which the centerline between the guide surface 41e and the inclined surface 71 runs towards the rotational axis line O1. A wedge member 73 (See FIG. 7) is provided at the wedge function portion 72 formed by a ball member to be in contact with the guide surface 41e and the inclined surface 71. The wedge member 73 is sandwiched between the end surface of the circular recessed portion 41b of the first rotation member 41 and the peripheral brim portion of the release plate 45 in an axial direction of the cam member 44 and movable in a radial direction of the cam member 44 by contacting the guide surface 41e and the inclined surface 71. The wedge member 73 is functioned to relatively move the guide wall 41a provided at the first rotation member 41 and the third pawl 43C engaged with the second rotation member 42 in a direction where both members are separating from each other by the operation of the wedge function portion 72 by pressing the wedge member 73 outwardly in a radial direction by the cam face 75 of the cam member 44.

As shown in FIG. 8, the cam member 44 is disposed in the circular recessed portion 42b of the second rotation member 42 and rotatable on the rotational axis line within the recessed portion 42b. The cam member 44 includes a penetrating bore 44a at the center portion thereof and three sets of cam faces 75 at the outer peripheral brim with an equal angle interval one another in a circle. One set of the cam faces 75 is arranged to be engageable with each pushing portion 76a, 76b and 76c of the inner surface cam portion 64 of the first pawl 43A. One set of the remaining two sets of cam faces 75 is arranged to be engageable with each pushing portion 76a, 76b and 76c of the inner cam surface portion 67 of the second pawl 43B and the other set of the remaining t two sets of cam faces 75 is arranged to be engageable with each pushing portion 76a, 76b and a wedge member 73 of the inner cam surface portion 67 of the third pawl 43C. The cam face 75 pushes the portion close to the engagement portion between the external teeth 63 and 66 of the first, second and third pawls 43A, 43B and 43C and the internal tooth 42a of the second rotation member 42 to surely lock the rotation of the second rotation member 42 relative to the first rotation member 41 with a strong force.

As shown in FIG. 7, each cam face 75 is formed by three pushing cam portions 77a, 77b and 77c which are to be contactable with the three pushing portions 76a, 76b and 76c of the first, second and third pawls 43A, 43B and 43C. The pushing cam portion 77c to be in contact with the wedge member 73 functions as the wedge pushing cam portion. Three pushing cam portions 77a, 77b and 77c are kept to respective angle positions to be in contact with each pushing portion 76a, 76b and 76c of the inner surface cam portions 64 and 67 of the first, second and third pawls 43A, 43B and 43C and each pushing portion 76a, 76b of the inner surface cam portion 67 of the third pawl 43C and the and the wedge member 73 when the cam member 44 is rotated to the lock position.

When the cam member 44 is rotated in a direction where the lock is released, the pushing cam portions 77a, 77b and 77c are separated from the pushing cam portions 76a, 76b and 76c and the wedge member 73 and the pushing cam portion (wedge pushing cam portion) 77c is kept to an angle position where the pushing cam portion engages with the circular arc surface 41f of the guide wall 41a. The side surface of the cam member 44 is provided with a plurality of engaging projections provided with an equal angle interval with one another in a circle. The pawl side groove cam portion 65 formed on the first pawl 43A engages with one of the plurality of engaging projections 78. The pawl side groove cam portion 65 and the plurality of engaging projections 78 function to move the first pawl 43A inwardly in a radial direction by the rotation of the cam member 44 in a lock releasing direction.

As shown in FIGS. 7 and 8, the release plate 45 is a thin plate having a penetrating bore 45a at the central portion thereof which is engaged with the engaging projection 78 of the side surface of the cam member 44 to be integrally formed therewith. The release plate 45 is attached to the cam member 44 so that the axial line of the release plate agrees to the axial line of the second block 62 of the first pawl 43A and is slidably movably facing to the end surface of the second pawl 43B. The second and the third pawls 43B and 43C and the release plate 45 are accommodated in the first pawl 43A within a thickness range thereof.

The release plate 45 is of approximately a circular ring shape with a recessed sector portion 45b at the circular ring portion and the first pawl 43A is disposed in this recessed sector portion 45b. The angle of recessed sector portion corresponds to the shape of the first pawl 43A so that the release plate 45 does not interfere with the first pawl 43A upon the rotation of the cam member 44.

Two release plate side groove cam portions 79 are provided circumferentially on the rotation center of the release plate 45 and penetrating through the release plate in a thickness direction. These release plate side groove cam portions 79 are positioned outwardly in a radial direction from the circumferential position of the engaging projection 78 so that the release plate side groove cam portions 79 correspond to the end surfaces of the second and third pawls 43B and 43C. The release plate side groove cam portions 79 are engaged with the engaging projections 68 provided on the second and the third pawls 43B and 43C, respectively. The engagement between the release plate side groove cam portions 79 and the engaging projections 68 the second and the third pawls 43B and 43C are moved inwardly in a radial direction when the cam member 44 is rotated together with release plate 45 in a direction where the lock is released (clockwise direction as viewed in FIG. 7).

As shown in FIG. 8, the lock spring 46 is as seen from the second rotation member 42 side, formed by a spiral spring wound in a c counterclockwise direction from the inner peripheral side to the pouter peripheral side. The outer side end portion 46a of the lock spring 46 is engaged with a recessed groove 41g of the first rotation member 41 and the inner side end 46b of the lock spring 46 is engaged with a recessed groove (not shown) of the cam member 44. The lock spring 46 urges the cam member 44 in a rotation direction, in counterclockwise direction as viewed from the second rotation member side 42. In other words, the lock spring 46 urges to rotate the cam member 44 in a lock position side. Each pawl 43A, 43B and 43C is urged in a direction where the engagement position with the internal tooth 42a of the second rotation member 42 is maintained by the lock spring 46.

As shown in FIG. 8, the rotating member 47 includes a hinge shaft 47a, an arm 47b, one end of which is fixed to one end of the hinge shaft 47a in an intersection direction and a contacting portion 47c provided at the other end of the arm 47b to be in parallel with the hinge shaft 47a. The hinge shaft 47a is arranged on the rotational axis line O1 of the first rotation member 41, the cam member 44 and the second rotation member 42 and rotatably penetrates through the penetration bores 41c, 44a and 42c respectively formed on the rotation central portion of the first rotation member 41, the cam member 44 and the second rotation member 42. Double chamfered portion with two chamfered sides is formed at approximately the central portion of the hinge shaft 47a in an axial direction and the penetrating bore 44a of the cam member 44, through which the hinge shaft 47a is penetrated is also double chamfered to be inserted into the double chamfered portion of the hinge shaft 47a for unitary rotation between the hinge shaft 47a and the cam member.

The penetrating bore 44a of the cam member 44 is formed slightly larger than the size of the double chamfered portion of the hinge shaft 47a to provide a play in a radial direction therebetween. Thus, the cam member 44 is slightly movable in a radial direction within the circular recessed portion 41b of the first rotation member 41. Accordingly, the cam member 44 can be self-adjusted so that each pawl 43A, 43B and 43C is engaged with the internal tooth 42a of the second rotation member 42 with an equal engagement force when the pawls 43A, 43B and 43C engage with the internal tooth 42a of the second rotation member 42. As shown in FIG. 6, the arm 47b is provided to be facing obliquely upward in a front direction and the contacting portion 47c is in contact with the lock/unlock device operating mechanism 80 provided at the operating lever 17. The contacting portion 47c is pushed and the arm 47b is rotated in a counterclockwise direction, the lock condition of the pawls 43A, 43B and 43C by the cam member 44 are released.

As shown in FIG. 5, the lock/unlock device 40 is disposed coaxially with the torque rod 28 between one of the base frames 23 and one end of the torque rod 28. The first rotation member 41 of the lock/unlock device 40 faces to the base frame 23 side and the second rotation member 42 faces to the torque rod 28 side and the first rotation member 41 is as will be explained later in detail fixed to the base frame 23 and the second rotation member 42 is also as will be explained later in detail fixed to the driving side rear link members 25 and the torque rod 28.

The first rotation member 41 of the lock/unlock device 40 is engaged with the engaging hole 23b formed on the side surface of the one of the base frames 23 and formed integral with the base frame 23 by welding or the like. The first rotation member 41 of the lock/unlock device 40 is engaged with the engaging hole 23b to be floatable in a radial direction so that the attachment position of the lock/unlock device 40 relative to the base frame 23 is adjustable in a radial direction. This can avoid center axis deviation between the bearing portion 49 of the lock/unlock device 40 and the bearing bore 23d of the base frame 23 by absorbing the gap between the first rotation member 41 and the one of the base frames 23.

A plurality of (for example, four) engaging projections 42g is provided on the second rotation member 42 at a surface opposite to surface of the first rotation member 41 side and arranged with a certain distance with one another in a circumferential direction. An insertion bore 25a for inserting one end of the torque rod 28 is provided on the driving side rear link member 25 and a plurality of (for example, four) engaging bores 25b which engage with the engaging projections 42g is formed around the insertion bore 25a. On the other hand, an insertion bore (not shown) is also provided on the driven side rear link member 25 in which the other end of the torque rod 28 is inserted. The driving side rear link member 25 is integrally formed on the second rotation member 42 by welding or the like under the engaging projections 42g being engaged with the engaging bores 25b. The insertion bore 25a of the driving side rear link member 25 formed integrally with the second rotation member 42 by welding or the like is inserted into the one end of the torque rod 28 and is integrally formed therewith by welding or the like.

As shown in FIG. 5 and FIG. 6, the operating lever 17 is rotatably supported on the base frame 23 and is kept to the neutral position. In other words, the shaft bore 17a formed at one end side of the operating lever 17 rotatably engaged with one end side of the rotation shaft 32a of the pinion gear 32 which penetrates through the shaft bore 23a formed on the base frame 23. A torsion coil spring 60 is provided on the operating lever 17 in coaxial with the shaft bore 17a and biases the operating lever 17 to keep the approximately horizontal neutral position (lever operating angle being zero), operating end side of the operating lever 17 being facing frontward.

The both end portions 60a and 60b of the torsion coil spring 60 are sandwiching the both side surfaces of the engaging portion 17b (See FIG. 6) provided at the outside surface of the operating lever 17 and the both side surfaces of the engaging portion 23c (See FIG. 6) provided at the outside surface of the base frame 23. This structure keeps the operating lever 17 to be in the neutral position. This torsion coil spring 60 may be eliminated from the structure, but in such case, a holding means is provided to keep the neutral position of the operating lever 17 and the occupant of the vehicle seat manually operates the lever to return to the neutral position from the upper position or from the lower position. A supporting shaft 17c (See FIG. 5) is provided in the vicinity of the shaft bore 17a of the inner side surface of the operating lever 17 for rotatably supporting the feed pawl 92 which will be later explained in detail.

As shown in FIGS. 5 and 6, the lock/unlock device operating mechanism 80 is provided in a radial direction at a rearward outer peripheral portion of the rotation end side of the operating lever 17 serving as a cam to be in contact with the contacting portion 47c of the rotating member 47 of the lock/unlock device 40. In other words, the lock/unlock device operating mechanism 80 rotates the rotating member 47 of the lock/unlock device 40 in response to the operation of the operating lever 17 to have the lock/unlock device 40 to be in the lock position or the unlock position. The lock/unlock device operating mechanism 80 includes a first unlock cam 81, a holding cam 82, and a second unlock cam 83. The first unlock cam 81 includes a fixed unlock cam 84 formed integrally with the operating lever 17 a swing unlock cam 85 swingably supported on the operating lever 17 and biased to be in contact with the fixed unlock cam 84. According to this embodiment, the fixed unlock cam 84 and the holding cam 82 are formed from one member.

The fixed unlock cam 84 functions as a cam which pushes the contacting portion 47c of the rotating member 47 to be in unlock position so that the lock/unlock device 40 produces the unlock condition while the operating lever 17 is rotated from the neutral position (lever operating angle being zero) as shown in FIG. 10 to the first position (for example, lever operating angle being +10 degree) in upper direction as shown in FIG. 11. The swing unlock cam 85 is swingably supported on the operating lever 17 at one end side through a pin 85a and is biased by a torsion coil spring 85b disposed in the pin 85a to be in contact with the fixed unlock cam 84.

The swing unlock cam 85 functions as a cam which is pushed by the contacting portion 47c of the rotating member 47 and swung to be separated from the fixed unlock cam 84 thereby passing through the contacting portion 47c to be facing to the swing unlock cam 85 portion of the firs unlock cam 81 at the initial position, while the operating lever 17 is rotated from the position shown in FIG. 16 to the neutral position as shown in FIG. 18 passing through the lower position shown in FIG. 17. The swing unlock cam 85 is brought into contact with the fixed unlock cam 84 again after the contacting portion 47c of the rotating member 47 passed the separated portion by the biasing force of the torsion coil spring 85b and faces with the passed contacting portion 47c. Accordingly, this facing position becomes the initial position of the contacting portion 47c and accordingly, the swing unlock cam 85 and the fixed unlock cam 84 function to have the lock/unlock device 40 to be in unlock condition upon pushing and rotating the contacting portion 47c of the rotating member 47 to be in unlock position.

The holding cam 82 is a cam which holds the rotating member 47 to the unlock position by contacting the contacting portion 47c so that the lock/unlock device 40 is kept to the unlock condition while the operating lever 17 is rotated from the first position to the second position in upward direction (for example, lever operating angle: +30 degree) shown in FIG. 14. The second unlock cam 83 is a cam which pushes the contacting portion 47c of the rotating member 47 to be to be in unlock position so that the lock/unlock device 40 is positioned to be in unlock condition while the operating lever 17 is rotated from the neutral position to the third position in downward direction (for example, lever operating angle: −10 degree) shown in FIG. 19.

As shown in FIG. 5 and FIG. 6, the rotation device driving mechanism 90 includes a ratchet wheel 91 formed on the pinion gear 32 integrally and co-axially therewith, a feed pawl 92 rotatably supported on the operating lever 17 and engaged with the ratchet wheel 91 when the operating lever 17 is rotated in one direction to rotatably drive the pinion gear 32 and disengaged from the ratchet wheel 91 when the operating lever 17 is rotated in the other direction and a separating member 93 fixed to the base frame 23 for separating the feed pawl 92 from the ratchet wheel 91 by contacting the feed pawl 92 while the operating lever 17 is rotated from the neutral position to the third position.

The ratchet wheel 91 is formed with a tooth 91a with a predetermined pitch angle. Assuming that the internal tooth 42a formed on the second rotation member 42 of the lock/unlock device 40 has the pitch angle of "C", the rotation speed ratio of the rotation speed of the sector gear relative to the rotation speed of the pinion gear 32 of the rotation device 30 is set to be "A" and the pitch angle of the tooth 91a of the ratchet wheel 91 is "B", the formula C=A×B can be established among the values. A one end side of the supporting shaft 17c provided at the operating lever 17 is rotatably inserted into the shaft bore 92a provided at the rotation end side of the feed pawl 92 passing through the elongated bore 23e provided on the base frame 23.

A torsion coil spring 94 is engaged with one end side of the supporting shaft 17c and is biasing in a direction that the pawl 92b at the tip end side of the feed pawl 92 engages with the tooth 91a of the ratchet wheel 91. One end portion 94a of the torsion coil spring 94 is engaged with the groove 92c formed on the outer peripheral surface of the feed pawl 92 and the other end portion 94b is engaged with a slit 17d provided at the one end side of the supporting shaft 17c and extending in an axial direction. The separating member 93 is provided at the inner peripheral surface of the operating lever 17 to be in contact with the inner peripheral surface of the feed pawl 92 in response to the downward rotation of the operating lever 17.

Next, the upward operation of the seat cushion 11 according to the embodiment will be explained with reference to FIGS. 10 through 18 and downward operation of the seat cushion 11 according to the embodiment will be explained with reference to FIGS. 10 and 19. It is noted here that the amount of the upward movement or the downward movement of the seat cushion 11, in other words, the amount of rotation of the driving side rear link member 25 is restricted by the engagement of the first detent surface 25c1 or the second detent surface 25c2 of the recessed portion 25c provided at the rotation end side of the driving side rear link member 25 with the engaging projection 23f provided at the inner peripheral surface of the base frame 23. Under the initial condition as shown in FIG. 10, the operating lever 17 is positioned at the neutral position (lever operating angle: zero degree) and that the pawl 92b of the feed pawl 92 of the rotation device driving mechanism 90 is in contact with a portion (back surface portion of the tooth 91a indicated as "2" in the drawing) separated from the tooth 91a portion, for example, the portion indicated as "1" in the drawing. In other words, the rotation device driving mechanism 90 is not associated with the rotation device 30 under this condition.

The contacting portion 47c of the rotating member 47 of the lock/unlock device 40 faces with the start point (swing unlock cam 85) of the first unlock cam 81 of the lock/unlock device operating mechanism 80 which is positioned at the initial position and external tooth 63, 66 of each pawl 43A, 43B and 43C, for example, in the drawing, the external tooth 66 of the second pawl 43B is indicated as "A", "B" and "C" is engaged with each internal tooth 42a of the second rotation member 42 which is also indicated as "A", "B" and "C" on the drawing, in this order. Thus the second rotation member 42 is locked relative to the first rotation member 41. This will restrict the rotation of the driving side rear link member 25 to hold the seat cushion 11 to the predetermined height position.

As shown in FIG. 11, when the operating lever 17 is operated to be rotated from the neutral position to the first position in upper direction (for example, lever operating angle: +10 degree) against the biasing force of the torsion coil spring 60, the feed pawl 92 of the rotation device driving mechanism 90 is moved upwardly together with the movement of the operating lever 17 and the pawl 92b of the feed pawl 92 moves idly until the back surface portion of the tooth 91a indicated as "2" of the ratchet wheel 91 contacts with the tooth 91a indicated as "1" while the operating lever 17 is operated. At the same time, the contacting portion 47c of the rotating member 47 of the lock/unlock device 40 is pushed by the first unlock cam 81 of the lock/unlock device operating mechanism 80 and the rotating member 47 of the lock/unlock device 40 is rotated in counterclockwise direction.

By such rotation of the rotating member 47, the cam member 44 of the lock/unlock device 40 and the release plate 45 are unitary rotated in the counterclockwise direction and each engagement of the pushing cam portions 77a, 77b and 77c of the cam surface 75 with the pushing portions 76a, 76b and 76c of the first, second and third pawls 43A, 43B and 43C is released. By the engagement between the pawl side groove cam portion 65 of the first pawl 43A and the engaging projection 78 of the cam 44, the first pawl 43A is pulled towards the rotational shaft line O1 along the guide surface 41a of the guide wall 41a to release the engagement between the external tooth 63 of the first pawl 43A and the internal tooth 42a of the second rotation member 42.

At the same time, by the engagement between the engaging projection 68 of the second and third pawls 43B and 43C and the release plate side groove cam portion 79 of the release plate 45, the second and the third pawls 43B and 43C are pulled towards the rotational shaft line O1 side along the guide surface 41e of the guide wall 41a thereby to release the engagement between the external tooth 66 of the second and the third pawls 43B and 43C and the internal tooth 42a of the second rotation member 42. Thus the locking of the second rotation member 42 relative to the first rotation member 41 is released and the driving side rear link member 25 is allowed to rotate.

Under this condition, since the pushing cam portion 77c of the cam surface 75 of the cam 44 is engaged with the inner peripheral surface 41f of the guide wall 41a, the center position of the cam 44 is adjusted by the inner peripheral surface 41f of the guide wall 41a. as the result, the gap between the external tooth 63 and 66 of the first, second and third pawls 43A, 43B and 43C and the internal tooth 42 of the second rotation member 42 becomes substantially even and the interference of the tooth tip of the external tooth 63 and 66 of the part of the pawls 43A, 43B and 43C with the tooth tip of the internal tooth 42a of the second rotation member 42 can be eliminated or minimized to restrict the generation of abnormal noise or the malfunctioning of rotation due to the interference between the tooth tips.

As shown in FIGS. 12 and 13, when the operating lever 17 is operated to be rotated from the first position to the second position in upward direction as shown in FIG. 14 overcoming the biasing force of the torsion coil spring 60, the feed pawl 92 of the rotation device driving mechanism 90 is moved upward together with the operating lever 17 and the pawl 92b of the feed pawl 92 pushes the tooth 91a of the ratchet wheel 91, the tooth indicated as "1" in a counterclockwise direction to rotate the ratchet wheel 91 during the operation of the operating lever 17. Then the driving side rear link member 25 is rotated in a clockwise direction. The rotating member 47 of the lock/unlock device 40 is kept to the unlock position by the engagement of the contacting portion 47c with the holding cam 82 of the lock/unlock device operating mechanism 80.

As shown in FIG. 14, when the operating lever 17 is rotated to the second position (for example, lever operating angle: +30 degree) overcoming the biasing force of the torsion coil spring 60, the feed pawl 92 of the rotation device driving mechanism 90 is moved upward together with the operating lever 17 and the pawl 92b of the feed pawl 92 pushes the tooth 91a of the ratchet wheel 91, the tooth indicated as "1" in the counterclockwise direction thereby to rotate the ratchet wheel 91 during the operation of the operating lever 17. Thus the driving side rear link member 25 is rotated in the clockwise direction and the external tooth 63, 66 formed on the first, second and third pawls 43A, 43B and 43C, for example, the external tooth 66 of the second pawl 43B indicated as "A" and "B" is engageable with the internal tooth 42a formed on the second rotation member 42 indicated as "B" and "C" in this order. The contacting portion 47c of the rotating member 47 of the lock/unlock device 40 is disengaged from the holding cam 82 of the lock/unlock device operating mechanism 80 and the rotating member 47 of the lock/unlock device 40 is rotated in a clockwise direction by the biasing force of the lock spring 46.

By this rotation of the rotating member 47, the cam member 44 is rotated and the pushing cam portions 77a, 77b and 77c of the cam member 44 move the first, second and the third pawls 43A, 43B and 43C outwardly in a radial direction along the guide surface 41e. Then the external tooth 63, 66 formed on the first, second and the third pawls 43A, 43B and 43C are engaged with the internal tooth 42a formed on the second rotation member 42. This will lock the rotation of the second rotation member 42 relative to the first rotation member 41 and the driving side rear link member 25 is restricted from rotation and the seat back 11 is kept to a predetermined height position higher than the initial condition.

At this time, the wedge member 73 provided on the wedge function portion 72 formed between the third pawl 43C and the guide wall 41a is pushed outwardly in a radial direction by the pushing cam portion 77c of the cam 44 and the third pawl 43C and the guide surface 41e of the guide wall 41a are separated from each other by the wedge function receiving force in a direction to be separating from each other. Then the first rotation member 41 on which the guide wall 41a is formed and the second rotation member 42 with which the third pawl 43C is engaged are relatively rotated thereby removing the gap between the plurality of first, second and third pawls 43A, 43B and 43C and the guide wall 41a.

Under such condition, since the operating lever 17 is positioned front side of the rotation operation direction by the cam 44, the cam 44 functions to move the third pawl 43C away from the wedge function portion 72 by the wedge function. As the third pawl 43C is moved away from the edge function portion 72, a gap between the cam 44 and the third pawl 43C is generated and the cam 44 further rotates in the lock direction. Accordingly, an unstable locking operation due to the provision of the wedge function portion 72 can be avoided.

As shown in FIG. 15, the contacting portion 47c is released from the holding cam 82 and when the operating lever 17 is released after the rotating member 47 has been returned to the lock position, the feed pawl 92 of the rotation device driving mechanism 90 is moved downwardly together with the operating lever 17. However, the feed pawl 92 is rotated in a clockwise direction overcoming the biasing force of the torsion coil spring 60 and the pawl 92b rides over the back surface of the tooth 91a of the ratchet wheel 91 to release the engagement with the tooth 91a.

As shown in FIG. 16, when the operating lever 17 is rotated and is returned from the second position to a position on the way to the neutral position in downward direction by the force of torsion coil spring 60, the contacting portion 47c of the rotating member 47 of the lock/unlock device 40 begins to be in contact with the swing unlock cam 85 of the lock/unlock device operating mechanism 80. Under this situation, since the external tooth 63 and 66 formed on the first, second and third pawls 43A, 43B and 43C engages with the internal tooth 42a formed on the second rotation member 42 to keep the rotation lock condition of the second rotation member 42 relative to the first rotation member 41.

As shown in FIG. 17, when the operating lever 17 is rotated further in a lower direction from the position shown in FIG. 16, overcoming the biasing force of torsion coil spring 60, the feed pawl 92 of the rotation device driving mechanism 90 is moved downward together with the operating lever 17 and the pawl 92b of the feed pawl 92 rides over the back surface of the tooth 91a of the ratchet wheel 91 indicated as "2" and moves to the position capable of engaging with the tooth 91a indicated as "2". Under this situation, the contacting portion 47c of the rotating member 47 of the lock/unlock device 40 rotates the swing unlock cam 85 of the lock/unlock device operating mechanism 80 in the counterclockwise direction and passes through the area between the swing unlock cam 85 and the fixed unlock cam 84.

As shown in FIG. 18, when the operating lever 17 is rotated from the position shown in FIG. 17 in a lower direction and is returned to the neutral position overcoming the biasing force of the torsion coil spring 60, the feed pawl 92 is moved downward together with the operating lever 17 and the pawl 92b of the feed pawl 92 moves to the back surface portion of the tooth 91a of the ratchet wheel 91 indicated as "3". The contacting portion 47c of the rotating member 47 of the lockΨunlock device 40 passes through the area between the swing unlock cam 85 and the fixed unlock cam 84 and faces at the start point of the first unlock cam 81 (swing unlock cam 85) and at the initial position. Thus, the upward movement operation of the seat cushion 11 is completed. As explained, the occupant of the seat cushion 11 rotates the operating lever 17 in upward direction being kept seated on the seat cushion 11. By this operation of the lever 17, the height of the seat cushion 11 is adjusted in upward direction keeping the seat cushion to be in horizontal condition due to the function of the parallel link mechanism 20.

From the initial condition as shown in FIG. 10 to the condition shown in FIG. 19, when the operating lever 17 is rotated from the neutral position to the downward third position (for example, operating lever angle: −10 degree), overcoming the biasing force of the torsion coil spring 60, the feed pawl 92 of the rotation device driving mechanism 90 is not engaged with the tooth 91a of the ratchet wheel 91 during the downward operation of the operating lever 17 and moved downward together with the operating lever 17. Then the feed pawl 92 is engaged with the separating member 93 and is rotated in clockwise direction overcoming the biasing force of the torsion coil spring 94. Thus the pawl 92b of the feed pawl 92 is separated from the back surface of the tooth 91a of the ratchet wheel 91 in a radial direction.

At the same time, the contacting portion 47c of the rotating member 47 of the lock/unlock device 40 is pushed by the second unlock cam 83 of the lock/unlock device operating mechanism 80 and the rotating member 47 of the lock/unlock device 40 is rotated in a counterclockwise direction. Due to the rotation of the rotating member 47, as similar operation as the operation explained with reference to FIG. 11, the locking condition of the second rotation member 42 relative to the first rotation member 41 is released to allow the driving side rear link member 25 to be rotated. Under this condition, when the occupant of the vehicle applies his or her weight on the seat cushion 11, the seat cushion 11 is moved downward overcoming the force of the lift spring 33.

After the seat cushion 11 being adjusted to a suitable height position for the occupant of the seat, the occupant releases the operating lever 17 to have the lever return to the upper neutral position by the biasing force of the torsion coil spring 60 from the position shown in FIG. 19. Then the pawl 92 of the rotation device driving mechanism 90 is moved upward together with the operating lever 17 and then rotated in the counterclockwise direction by the biasing force of the torsion coil spring 94. Then as shown in FIG. 10, the pawl 92b of the feed pawl 92 is brought into contact with the back surface of the tooth 91a of the ratchet wheel 91 and at the same time, the rotating member 47 of the lock/unlock device 40 is rotated in clockwise direction until the contacting portion 47c of the rotating member 47 is brought into contact with the start point of the second unlock cam 83 (start point of the first unlock cam 81).

Due to the rotational movement of the rotating member 47, the rotation of the second rotation member 42 relative to the first rotation member 41 is locked similar to the operation explained with reference to FIGS. 14 and 15. Accordingly, the rotation of the driving side rear link member 25 is restricted and the seat cushion 11 is fixed to a height position lower than the initial condition by a predetermined value. Thus the lowering operation of the seat cushion 11 is completed. By this operation of the lever 17, the height of the seat cushion 11 is adjusted in downward direction keeping the seat cushion to be in horizontal condition due to the function of the parallel link mechanism 20.

FIGS. 20 and 21 show a second embodiment according to the invention and the detail explanation thereof will be made mainly regarding to the different points from the first embodiment and the same reference numerals are used for the structure of the same component and detail explanation will be omitted. The lock/unlock device operating mechanism 80 according to the second embodiment includes a first unlock cam 81 and a holding cam 82 facing the first unlock cam 81 which function as same as the first unlock cam 81 and the holding cam 82 of the lock/unlock device operating mechanism 80 according to the first embodiment. In detail, instead of using the second unlock cam 83 of the first embodiment, the first unlock cam 81 and the holding cam 82 are provided. Further, according to the rotation device driving mechanism 90 of the second embodiment, an engaging wheel 95 and a pair of engaging members 96 and 97 are provided instead of the ratchet wheel 91 and the feed pawl 92 of the rotation device driving mechanism 90 of the first embodiment. The structure of the engaging wheel 95 and the pair of engaging members 96 and 97 is different from the structure of the ratchet wheel 91 and the feed pawl 92.

The engaging wheel 95 is integrally formed on the rotation shaft 32a and coaxial with the pinion gear 32. A triangle tooth 95a is formed on the engaging wheel 95. A central portion of each pair of engaging members 96 and 97 is rotatably mounted on the rotation shaft 98 in a manner that when one end side comes closer, the other end side backs away. The rotation shaft 98 is arranged in parallel with the rotation shaft 32a of the engaging wheel 95 and fixedly supported on the connecting member 99 which is rotatably supported on the rotation shaft 32a. the pair of engaging members 96 and 97 is provided with a plurality of engaging teeth 96a and 97a to be in contact with the triangle tooth 95a of the engaging wheel 95 at each one end side having a predetermined interval with one another in a radial direction. The other end of each pair of engaging members 96 and 97 is engaged with both ends of a coil spring 100, respectively. An engagement operating member 101 is provided between the other ends of the pair of engaging member 96 and 97 for rotating the pair of engaging members 96 and 97 in response to the rotation of the operating lever 17. The engagement operating member 101 is provided at the operating lever 17 to be passing through the elongated bore 23e of the base frame 23.

In the initial condition shown in FIG. 20, the operating lever 17 is positioned in the neutral position and the engaging members 96 and 97 of the rotation device operating mechanism 90 are rotated in clockwise and counterclockwise directions by the biasing force of the coil spring 100 and accordingly, the engaging teeth 96a and 97a are disengaged from the triangle tooth 95a of the engaging wheel 95. In other words, the rotation device operating mechanism 90 does not function on the rotation device 30. When the operating lever 17 is rotated in upward direction the other end of the upper side engaging member 96 is pushed upward by the engagement operating member 101. The friction resistance between the rotation shaft 32a of the engaging wheel 95 and the connecting member 99 is set to be larger than the friction resistance between the engaging member 96 and the rotation shaft 98. Accordingly, the connecting member 99 does not rotate about the rotation shaft 32a of the engaging wheel 95, but only the engaging member 96 rotates about the rotation shaft 98 in a counterclockwise direction. Since the engaging tooth 96a is provided separately from the triangle tooth 95a, it would take some time to have the engaging tooth 96a to be engaged with the triangle tooth 95a and the lock/unlock device 40 is unlocked while this time lag. Then the engaging tooth 96a of the engaging member 96 is engaged with the triangle tooth 95a of the engaging wheel 95 and the engaging wheel 95 is pushed by the engaging member 96 to be rotated in the counterclockwise direction. Thus the rotation device 30 and the lock/unlock device 40 are operated as same as the operation thereof in the first embodiment and finally the seat cushion 11 is moved upwardly to a suitable position.

On the other hand, when the operating lever 17 is rotated downwardly, the other end of the lower side engaging member 97 is pushed down by the engagement operating member 101. Then, according to the same reason with the operation of the upper side engaging member 96, only the engaging member 97 is rotated in the clockwise direction about the rotation shaft 98. Since the lock/unlock device 80 is provided with the first unlock cam 81 (fixed unlock cam 84 and the swing unlock cam 85) and the holding cam 82 instead of the second unlock cam 83 of the first embodiment, the rotation device 30 and the lock/unlock device 40 are operated as similar to the operation of the operating lever 17 to rotate upwardly. Finally, the seat cushion 11 is lowered.

According to the first and the second embodiments of the invention, the lock/unlock device 40 is provided with the engagement/disengagement mechanism 48 which produces a lock condition to restrict the relative rotation between the first rotation member 41 and the second rotation member 42 or an unlock condition to allow the relative rotation between the first rotation member 41 and the second rotation member 42 by the engagement or disengagement of the first, second and third pawls 43A, 43B and 43C movably supported on the first rotation member 41 fixed to the base frame 23 side with or from the second rotation member 42 fixed to the driving side rear link member 25 side by the operation of the lock/unlock device operating mechanism 80 associated with the rotation of the operating lever 17 in upward direction. Accordingly, the vehicle seat lifter device 13 can firmly hold the lifted position of the vehicle seat 10 when an external force applied to the vehicle seat 10 upon a vehicle collision accident is applied on the engagement/disengagement mechanism 48 through the driving side rear link member 25.

The rotation device 30 has a function to relatively rotate the base frame 23 and the driving side rear link member 25. The rotation device 30 and the lock/unlock device 40 are structured to be operable by the operating lever 17 through the rotation device driving mechanism 90 and the lock/unlock device operating mechanism 80. Accordingly, different from the conventional devices the operating lever is not needed to be frequently reciprocated and the lifting adjustment of the vehicle seat can be simply performed. Further, the rotation device driving mechanism 90 controls the rotation device 30 to be in a freely rotatable condition, while the operating lever 17 is rotated from the neutral position to the downward third position. Accordingly, the driving side rear link member 25 is freely rotated relative to the base frame 23 thereby to quickly adjust the lifted position of the vehicle seat 10.

According to the first and the second embodiments of the invention, the lock/unlock device 40 includes the first rotation member 41 on which the first, second and third pawls 43A, 43B and 43C are supported movably but only in a radial direction and at the same time on which the cam member 44 is supported for advancing and retreating the first, second and third pawls 43A, 43B and 43C in the radial direction and the second rotation member 42 on which the internal tooth 42a is formed for engaging with and disengaging from the external tooth 63 and 66 formed on the tip end of the first, second and third pawls 43A, 43B and 43C. Thus, by rotating the rotating member 47 by operating the cam member 44, the internal tooth 42a of the second rotation member 42 is engaged with or disengaged from the external tooth 63 and 66 of the first, second and third pawls 43A, 43B and 43C. This can simplify the lifting adjustment structure of the vehicle seat 10.

Further, according to the first and the second embodiments of the invention, the lock/unlock device operating mechanism 80 includes the unlock cam 81 which operates the lock/unlock device 40 to be in unlock condition while the operating lever 17 is rotated from the neutral position to the first position, and the holding cam 82 which operates the lock/unlock device 40 to be kept to the unlock condition while the operating lever 17 is rotated from the first position to the second position. When the operating lever 17 is rotated further to exceed the second position, the contacting portion 47c of the rotating member 47 of the lock/unlock device 40 is released from the engagement with the holding cam 82. Then the rotating member 47 is returned to the lock position. The unlock cam 81 is formed by the fixed unlock cam 84 and the swing unlock cam 85. When the operating lever 17 returns to the neutral position, the contacting portion 47c of the rotating member 47 which has been returned to the lock position, swings the swing unlock cam 85 and passes through the area between the fixed unlock cam 84 and the swing unlock cam 85 to face the swing unlock cam 85 at the initial position. Accordingly, the contacting portion 47c of the rotating member 47 faces the swing unlock cam 85 at the initial position by only the swinging operation of the swing unlock cam 85. This can simplify the structure of the lick/unlock device operating mechanism 80.

Further, according to the first and the second embodiments of the invention, the rotation device 30 is formed by the gear mechanism and the rotation device driving mechanism 90 is formed by ratchet mechanism. Accordingly, the relative rotation angle between the base frame 23 and the driving side rear link member 25, i.e., the lifting adjustment amount of the vehicle seat 10 can be freely and randomly adjusted by adjusting the pitch angles of the gears and ratchet mechanism.

Further, according to the first embodiment of the invention, since the lift spring 33 is always biasing the base frame 23 in an upward direction, after the lock/unlock device 40 is controlled to be in unlock condition for lowering the base frame 23, the occupant can freely adjust the height of the vehicle seat to a desired position by lowering the vehicle seat 10 by the occupant's own weight. This can improve the operability of the seat lifter device 13 for the vehicle.

Further, according to the first embodiment of the invention, since the pitch angle "C" of the internal tooth 42a of the lock/unlock device 40 is formed to be computed by multiplication of rotation speed ratio "A" of the pinion gear relative to the rotation speed of the sector gear 31 by the pitch angle "B" of the ratchet wheel 91 (C=A×B), the lock/unlock device 40 can be surely in lock condition, every one operation of the operating lever 17 which rotates the ratchet wheel 91 with one pitch angle.

The invention have been explained in accordance with the above embodiment, however, the invention is not limited to the structure explained by the embodiment and various changes or modifications can be made within the scope of the appended claims.

INDUSTRIAL APPLICABILITY

The seat lifter device according to the invention can be adapted to a device for adjusting the height of the vehicle seat cushion and suitable for the device that requires a smooth height adjustment of the vehicle seat cushion.

According to the embodiment of the invention, the lock/unlock device 40 is provided with the engagement/disengagement mechanism 48 to produce a lock condition in which the relative rotation between a first rotation member 41 and a second rotation member 42 is restricted and an unlock condition in which the relative rotation between the first and the second rotation members 41 and 42 is allowed by the engagement/disengagement operation of the engagement/disengagement mechanism 48 such that a pawls movably supported on the first rotation member 41 fixed to the base frame side engage with or disengage from the second rotation member 42 fixed to the rear link members 25. This seat lifter device can firmly hold the seat lifted position even when an exterior force generated upon a vehicle collision is applied to the engagement/disengagement mechanism 48 through the rear link members 25.

According to another aspect of the embodiment of the invention, the rotation device 30 has a function to relatively rotate the base frame 23 and the rear link member 25. This rotation device 30 and the lock/unlock device 40 are structured to be operated by the operating lever 17 through the lock/unlock device operating mechanism 80. Accordingly, it is not necessary to repeatedly reciprocate the operating lever 17 as was in conventional device and the adjustment of the seat lifted position can be simplified.

According to the embodiment, since the rotation device driving mechanism 91 operates to have the rotation device to be freely movable while the operating lever is rotated in the other direction from the neutral position to the third position, the rear link members 25 can be freely rotatable relative to the base frame 23 to promptly adjust the lifted position of the vehicle seat 10.

According to further aspect of the embodiment, since the rotation device 30 is formed by the gear mechanism (sector gear 31 and pinion gear 32), and the rotation device driving mechanism 90 is formed by a ratchet mechanism 91, 92, 93, the relative rotation angle between the base frame 23 and the rear link member 25, in other words, the lifted amount of the vehicle seat 10 can be randomly or freely adjusted by adjusting the pitch angles of the gear and the ratchet.

According to the embodiment of the invention, since the lift spring 33 always biases the base frame in upward direction, after the lock/unlock device 40 has been in unlock condition to lower the base frame 23, the seat lifted position can be freely and randomly adjusted by the occupant's own weight. This can improve the operability of the seat lifter device.

According to another feature of the embodiment, since the pitch angle "C" of the internal tooth 42a of the lock/unlock device 40 is calculated by C=A×B, wherein the "A" represents the rotation speed ratio of the sector gear 31 relative to the rotation speed of the pinion gear 32 and the "B" represents the pitch angle of the ratchet wheel 91, the lock/unlock device 40 can be surely brought into lock condition every one operation of the operating member which rotates one pitch angle of the ratchet wheel 91.

According to still further feature of the embodiment, since the lock/unlock device 40 includes the first rotation member 41 on which the pawls 43A, 43B and 43C are supported and movable only in a radial direction, and further at the same time on which the cam member 44 is rotatably supported and the second rotation member 42 on which the internal tooth 42a is formed which engages with or disengages from the external tooth 63, 66 formed on the tip end of the pawls 43, the engagement/disengagement of the external tooth 63, 66 with or from the internal tooth 42a of the second member 42 by the rotation of the cam member 44 by the rotating member 47 to simplify the structure for lifted position adjustment of the vehicle seat.

According to further aspect of the embodiment, the lock/unlock device operating mechanism 80 includes the operating member 47 which includes an unlock cam 81-85 for unlocking the lock/unlock device while the operating lever 17 is rotated from the neutral position to the first position and a holding cam 82 for holding the lock/unlock device 40 to the unlock condition while the operating lever 17 is rotated from the first position to the second position. When the operating lever 17 exceeds the second position, the contacting portion 47c of the rotating member 47 of the lock/unlock device 40 is released from the holding cam 82 to return the rotating member 47 to the lock position. The unlock cam 81-85 is structured to have the fixed unlock cam 81 and to swing unlock cam 85. Accordingly, when the operating lever 17 is returned to the neutral position, the contacting portion 47c of the rotating member which has been returned to the lock position, swings swing unlock cam 85 and passes through the space between the fixed unlock cam 84 and the swing unlock cam 85 to face the swing unlock cam 85. Accordingly, the contacting portion 47c of the rotating member of the lock/unlock device 40 can be faced to the unlock cam 81-85 at the initial position by only swinging the swing unlock cam 85. This can simplify the structure of the lock/unlock device operating mechanism 80.

The invention claimed is:

1. A seat lifter device for a vehicle, comprising:
a pair of right and left base frames;
a pair of right and left rear link members;
a torque rod for connecting the pair of right and left rear link members for torque transmission;
a pair of front right and left link members each including an end being pivoted on a front portion of each of the pair of right and left base frames and forming a parallel link mechanism with the rear link members;
a rotation device for relatively rotating the base frames and the rear link members;
a lock/unlock device having an engagement/disengagement mechanism for engaging or disengaging a detent member movably supported on a first rotation member fixed to a base frame side, with or from a second rotation member fixed to a rear link member side and a rotating member supported on the base frame side and engaging with or disengaging from the engagement/disengagement mechanism, wherein the lock/unlock device produces a lock condition in which the relative rotation between the first and the second rotation members is restricted by the engagement of the detent member with the second rotation member and an unlock condition in which the relative rotation between the first and the second rotation members is allowed by the disengagement of the detent member from the second rotation member; and
an operating member rotatably supported on at least one of said base frames and biased to a neutral position.

2. The seat lifter device for a vehicle according to claim 1, further comprising:
a lock/unlock device operating mechanism for operating the rotating member of the lock/unlock device to be rotated in response to the rotation of the operating member from the neutral position in one direction thereby to operate the lock/unlock device to be in the unlock condition while the operating member is rotated from the neutral position to a first position and to keep the unlock condition while the operating member is rotated from the first position to a second position, the lock/unlock device operating mechanism further operating the lock/unlock device to return to the lock condition when the position of the operating member goes beyond the second position and at the same time allowing the operating member to be returnable to the neutral position, the lock/unlock device operating mechanism further operating the rotating member to be rotated in response to the rotation of the operating member from the neutral position in an other direction thereby to operate the lock/unlock device to be in the unlock condition while the operating member is rotated from the neutral position to a third position and at the same time to be returnable to the lock condition when the position of the operating member returns to the neutral position from the third position.

3. The seat lifter device for the vehicle according to claim 2, further comprising a rotation device driving mechanism, wherein the rotation device driving mechanism is operated in response to the rotation of the operating member in the one direction from the neutral position, idly movable while the operating member is rotated from the neutral position to the first position, drives the rotation device to rotate the rear link member relative to the base frame in a direction that a seat cushion mounted on said right and left base frames is raised upwardly while the operating member is rotated from the first position to the second position, idly movable while the operating member returns to the neutral position and is operated in response to the rotation of the operating member from the neutral position in the other direction, and drives the rotation device to be in freely rotatable condition to have the rear link member to be freely rotatable relative to the base frame while the operating member is rotated from the neutral position to the third position.

4. The seat lifter device for the vehicle according to claim 3, wherein
the rotation device includes a sector gear formed integrally with the rear link member and a pinion gear engaged with the sector gear and rotatably supported on the base frame,
the rotation device driving mechanism includes a ratchet wheel formed integrally and coaxially with the pinion gear, a feed pawl rotatably supported on the operating member and engaging with the ratchet wheel when the operating member is rotated in the one direction to drive the pinion gear to rotate and disengaging from the ratchet wheel when the operating member is rotated in the other direction, and
a separating member fixed to the base frame is brought into contact with the feed pawl to have the feed pawl be separated from the ratchet wheel while the operating member is rotated from the neutral position to the third position.

5. The seat lifter device for the vehicle according to claim 4, further including
a base frame upward biasing means, one end of which is engaged with the base frame and the other end of which is engaged with the pinion gear of the rotation device and biasing the base frame to move upwardly.

6. The seat lifter device for the vehicle according to claim 4, assuming that a pitch angle of an internal tooth of the lock/unlock device is indicated as "C", a rotation speed ratio of the sector gear relative to the pinion gear is indicated as "A" and that a pitch angle of the ratchet wheel is indicated as "B", the pitch angle "C" is represented as $C = A \times B$.

7. The seat lifter device for the vehicle according to claim 2, wherein the lock/unlock device produces the lock condition and the unlock condition by
the second rotation member being engaged with the first rotation member fixed to the base frame side and rotatable on the axial center of the torque rod through a bearing portion relative to the first rotation member;
the detent member being supported on the first rotation member and movable only in a radial direction and a cam member being rotatably supported on the first rotation member to operate the detent member to advance or retreat in the radial direction;
an internal tooth being formed on the second rotation member and engageable with an external tooth formed on a tip end of the detent member; and
the detent member being moved in the radial direction when the cam member is rotated by the rotating member wherein the external tooth engages with or disengages from the internal tooth.

8. The seat lifter device for the vehicle according to claim 7, wherein the lock/unlock device operating mechanism is characterized in that:
the operating member is provided with an unlock cam for rotating the rotating member to the unlock position by pushing a contacting portion provided at an end portion of the rotating member so that the lock/unlock device is brought into the unlock condition while the operating member is rotated from the neutral position to the first position and a holding cam for holding the lock/unlock device to the unlock position by engaging with the contacting portion so that the lock/unlock device is kept to the lock condition while the operating member is rotated from the first position to the second position;
the contacting portion of the rotating member is released from the holding cam to have the rotating member to be rotated to the lock position so that the lock/unlock device returns to the lock condition when the operating member goes beyond the second position;
the unlock cam is formed by a fixed unlock cam integrally formed on the operating member and a swing unlock cam swingably supported on the operating member and biased to be in contact with the fixed unlock cam; and that
the contacting portion of the rotating member which has been returned to the lock position operates to swing the swing unlock cam and passes through the fixed unlock cam and the swing unlock cam to face with the swing unlock cam at the initial position when the operating member returns to the neutral position.

* * * * *